US 6,687,416 B2
Feb. 3, 2004

(54) METHOD FOR DETERMINING A CORRELATION BETWEEN IMAGES USING MULTI-ELEMENT IMAGE DESCRIPTORS

(75) Inventor: Lizhi Wang, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 141 days.

(21) Appl. No.: 09/791,538

(22) Filed: Feb. 21, 2001

(65) Prior Publication Data

US 2001/0051004 A1 Dec. 13, 2001

Related U.S. Application Data

(63) Continuation of application No. 09/175,146, filed on Oct. 19, 1998, now Pat. No. 6,256,409.

(51) Int. Cl.[7] .................................................. G06K 9/64
(52) U.S. Cl. ...................... 382/278; 382/168; 382/181; 382/190; 382/209; 382/219; 382/286; 382/228; 382/305; 707/6
(58) Field of Search ................................ 382/168, 170, 382/181, 190, 191, 209, 219, 278, 286, 225, 228, 305, 306, 203, 141; 707/6, 5, 104.1

(56) References Cited

U.S. PATENT DOCUMENTS

| | | |
|---|---|---|
| 4,646,250 A | 2/1987 | Childress |
| 4,672,683 A | 6/1987 | Matsueda |
| 4,716,404 A | 12/1987 | Tabata et al. |
| 4,739,407 A | 4/1988 | Mack et al. |
| 4,829,453 A | 5/1989 | Katsuta et al. |
| 4,850,025 A | 7/1989 | Abe |
| 4,944,023 A | 7/1990 | Imao et al. |
| 5,012,334 A | 4/1991 | Etra |
| 5,049,986 A | 9/1991 | Aono et al. |

(List continued on next page.)

OTHER PUBLICATIONS

Berry, Michael W.; Dumais, Susan, T.; Letsche, Todd, A.; Computational Methods for Intelligent Information Access; Department of Computer Science; University Of Tennessee, Knoxville, TN, 37996–1301; berry@cs.itk.edu; Information Science Research Group; Bellcore, 445 South Street, Room 2L–371, Morristown, NJ 07962–1910, std@bellcore.com; Department of Computer Science, University of Tennessee, Knoxvilee, TN, 37996–1301, letsche@cs.utk.edu; Copyright 1995 by the Association for Computing Machinery, Inc. (ACM); pp. 1–38.

(List continued on next page.)

*Primary Examiner*—Phuoc Tran
*Assistant Examiner*—Ali Bayat
(74) *Attorney, Agent, or Firm*—Blakely, Sokoloff, Taylor & Zafman LLP

(57) ABSTRACT

A method of determining a correlation between images, wherein each image is represented by an image descriptor. Each image descriptor comprises a peak descriptor, a set of statistic descriptors, and a set of co-occurence descriptors. Initially, a category associated with each image descriptor is determined. Provided the image descriptors belong to a common category, a difference value between select corresponding components of respective image descriptors is determined in accordance with an associated correlation protocol, the difference value representing the correlation between the images represented by respective image descriptors.

30 Claims, 22 Drawing Sheets

(6 of 22 Drawing Sheet(s) Filed in Color)

U.S. PATENT DOCUMENTS

| | | |
|---|---|---|
| 5,093,867 A | 3/1992 | Hori et al. |
| 5,148,522 A | 9/1992 | Okazaki |
| 5,179,652 A | 1/1993 | Rozmanith et al. |
| 5,202,828 A | 4/1993 | Vertelney et al. |
| 5,220,648 A | 6/1993 | Sato |
| 5,249,056 A | 9/1993 | Foung et al. |
| 5,363,477 A | 11/1994 | Kuragano et al. |
| 5,381,158 A | 1/1995 | Takahara et al. |
| 5,384,719 A | 1/1995 | Baker et al. |
| 5,404,396 A | 4/1995 | Brennan |
| 5,421,008 A | 5/1995 | Banning et al. |
| 5,428,727 A | 6/1995 | Kurosu et al. |
| 5,432,893 A | 7/1995 | Blasubramanian et al. |
| 5,434,966 A | 7/1995 | Nakazawa et al. |
| 5,448,631 A | 9/1995 | Cain |
| 5,452,370 A | 9/1995 | Nagata |
| 5,469,209 A | 11/1995 | Gunday et al. |
| 5,469,512 A | 11/1995 | Fujita et al. |
| 5,530,869 A | 6/1996 | Salle |
| 5,544,284 A | 8/1996 | Allebach et al. |
| 5,572,727 A | 11/1996 | Larsson et al. |
| 5,579,471 A | 11/1996 | Barber et al. |
| 5,586,197 A | 12/1996 | Tsujimura et al. |
| 5,621,821 A | 4/1997 | Pearman et al. |
| 5,664,080 A | 9/1997 | Lucas et al. |
| 5,687,239 A | 11/1997 | Inanaga et al. |
| 5,704,013 A | 12/1997 | Watari et al. |
| 5,729,471 A | 3/1998 | Jain et al. |
| 5,734,747 A * | 3/1998 | Vaidyanathan ............... 382/170 |
| 5,745,126 A | 4/1998 | Jain et al. |
| 5,751,286 A | 5/1998 | Barber et al. |
| 5,767,893 A | 6/1998 | Chen et al. |
| 5,777,620 A | 7/1998 | Billyard |
| 5,793,888 A | 8/1998 | Delanoy |
| 5,794,249 A | 8/1998 | Orsolini et al. |
| 5,835,099 A | 11/1998 | Marimont |
| 5,893,095 A | 4/1999 | Jain et al. |
| 5,911,139 A | 6/1999 | Jain et al. |
| 5,913,205 A | 6/1999 | Jain et al. |
| 5,915,250 A | 6/1999 | Jain et al. |
| 5,926,555 A | 7/1999 | Ort et al. |
| 5,966,434 A | 10/1999 | Schafer et al. |
| 5,983,237 A | 11/1999 | Jain et al. |
| 5,987,456 A | 11/1999 | Ravela et al. |
| 6,016,487 A * | 1/2000 | Rioux et al. ................... 707/2 |
| 6,016,494 A | 1/2000 | Isensee et al. |
| 6,035,055 A | 3/2000 | Wang et al. |
| 6,035,057 A | 3/2000 | Hoffman |
| 6,120,299 A | 9/2000 | Trenholm et al. |
| 6,167,167 A * | 12/2000 | Matsugu et al. ............ 382/283 |
| 6,175,829 B1 | 1/2001 | Li et al. |
| 6,256,596 B1 | 7/2001 | Leite, Jr. et al. |
| 6,269,368 B1 | 7/2001 | Diamond |
| 6,278,793 B1 * | 8/2001 | Gur et al. ................... 382/128 |

OTHER PUBLICATIONS

Faloutsos, C.; et al.; Efficient and Effective Querying by Image Content; IBM Research Division, Almaden Research Center, K54/802, 650 Harry Road, San Jose 95120–6099; pp. 1–27.

Huang, Jing, et al.; Image Indexing Using Color Correlograms; Cornell University, Ithaca, NY 14853; 7 pages.

Indyk, Piotr, et al.; Locality–Preserving Hashing in Multidimensional Spaces.; Department of Computer Science, Stanford University; IBM Almaden Research Center; School of Computer Science, Carnegie–Mellon University; A preliminary version of this paper was published in Proceedings of the 29th Annual ACM Symposium on Theory of Computing, pp. 618–625, 1997; 2 pages.

Jacobs, Charles, E., et al; Fast Multiresolution Image Querying; Department of Computer Science and Engineering, University of Washington, Box 352350, Seattle, WA 98195–2350, Technical Report 95–01–06, Jan. 24, 1995; revised May 20, 1995; Proceedings of SIGGRAPH 95(Los Angeles, CA, Aug. 6–11, 1995), In Computer Graphics Proceedinga, Annual Conference Series, 1995, ACM SIGGRAPH, New York, 1995; 11 pages.

Kanth, K.V. Ravi, et al.; Dimensionality Reduction for Similarity Searching in Dynamic Databases; Department of Computer Science, University of California at Santa Barbara; 11 pgs.

VIR Image Engine; Product & Technologies; http://www.virage.com/market/vir–body.htm; Aug. 23, 1998; 4 pgs.

Bach, Jeffrey R., et al..; The Virage Image Search Engine: An open framework for image management; Proceedings Of SPIE, US, Bellingham, SPIE, vol. 2670, 1996, pp. 76–87; XP 000642564; ISBN: 0–8194–2044–1.

Binaghi, Elisabetta, et al.; Indexing and Fuzzy Logic–Based Retrieval of Color Images; Visual Database; Visual Database Systems, II; Proceedings of the IFIP TC2/WG2.6 Second Working Conference on Visual Database Systems; Budapest, Hungary, Sep. 30–Oct. 3, 1991; published by Elsevier Science Publishers B.V., Amsterdam, The Netherlands 1992; pp. 79–92.

Lemstrom, Kjell, et al.; PICSearch–A Platform for Image Content–based Searching Algorithms; WSCG '98; 6th International Conference On Computer Graphics And Visualization 98; Plzen; Czech Republic, Feb. 9–13, 1998; pp. 222–229; vol. 2, XP 002133666, Plzen, Czech Republic, University of West Bohemia Press, Czech Republic ISBN: 88–7082–359–3.

Orphanoudakis, S.C., et al.; $I^2C$: A System for the Indexing, Storage, and Retrieval of Medical Images by Content; International Europacs Meeting, Rennes, France; Sep. 30–Oct. 2, 1993, vol. 19, No. 2, pp. 1–18, XP002133667; Medical Informatics, Apr.–Jun. 1994, UK, ISSN: 0307–7640.

Swain, Michael J., et a.; Color Indexing; International Journal of Computer Vision, vol. 7, No. 1, 1991; Kluwer Academic Publishers, The Netherlands, pp. 11–32.

Tamura, Hideyuki, et al.; Textural Features Corresponding to Visula Perception; IEEE Transactions On Systems, Man, And Cybernetics, vol. SMC–8, No. 6, Jun. 1978; pp. 460–472.

Ubell, Michael, et al.; Embedding image query operations in an object–relational database management system; Storage And Retrieval For Image And Video Datases III, San Jose, CA, USA, Feb. 9–10, 1995, vol. 2420, pp. 197–203, XP–000892557, Proceeding sof the SPIE—The International Society for Optical Engineering, 1995, UAA, ISSN: 0277–786X.

Search Report for PCT/US 99/24094 mailed Apr. 4, 2000, 2 pages.

Magnifi Application Server; http://www.magnifi.com/02/appserver/contents.htm; Aug. 23, 1998; 4 pgs.

Oracle8™ Image Data Cartridges, Features Overview, Jun. 1997; http://www.oracle.com/st/o8collateral/html/ximg5fov.htm; Aug. 23, 1998; 13 pgs.

* cited by examiner

METHOD FOR DETERMINING A CORRELATION BETWEEN IMAGES USING MULTI-ELEMENT IMAGE DESCRIPTORS

This application is a continuation pursuant to 37 C.F.R. § 1.53(b) of application "A Method for Determining a Correlation Between Images Using Multi-Element Image Descriptors", Ser. No. 09/175,146 filed Oct. 19, 1998 now U.S. Pat. No. 6,256,409.

FIELD OF THE INVENTION

The present invention relates to image descriptors and image processing. More specifically, the present invention relates to a technique for determining a correlation between images represented by multi-element image descriptors.

BACKGROUND

Image processing allows for the comparison of a reference image against another image or multiple images in order to determine a "match" or correlation between the respective images. Accordingly, a variety of different image matching techniques have been employed to determine such a match or correlation between images.

One such image matching technique is known as object classification. The object classification technique operates by segmenting the original image into a series of discrete objects which are then measured using a variety of shape measurement identifications, such as shape dimensions and statistics, to identify each discrete object. Accordingly, each of the discrete objects are then classified into different categories by comparing the shape measurement identifications associated with each of the discrete objects against known shape measurement identifications of known reference objects. As such, the shape measurement identifications associated with each of the discrete objects are compared against known shape measurement identifications of known reference objects in order to determine a correlation or match between the images.

Another image matching technique utilized in determining a match between images is a process known as match filtering. Match filtering utilizes a pixel-by-pixel or image mask comparison of an area of interest associated with the proffered image against a corresponding interest area contained in the reference image. Accordingly, provided the area of interest associated with the proffered image matches the corresponding interest area of the reference image, via comparison, an area or pixel match between the images is accomplished and the images are considered to match.

Yet another technique utilizes a series of textual descriptors which are associated with different reference images. The textual descriptors describe the image with textual descriptions, such as shape (e.g., round), color (e.g., green), and item (e.g., ball). Accordingly, when a proffered image is received for comparison, the textual descriptor of the proffered image is compared against the textual descriptors associated with the reference images. As such, the textual descriptor associated with the respective images under comparison are compared to each other in order to determine a best match between the textual descriptions associated with each image, and therefore a match between the respective images.

Each of the aforementioned image matching techniques utilize different types of data or partial image data to describe the images under comparison, however, the aforementioned techniques typically may not utilize the actual full image data associated with the each image in order to perform image comparison. Accordingly, the aforementioned techniques do not provide for an optimal accurate image comparison as the aforementioned techniques are limited to the usage of only a small or fractional portion of the full representative image data for comparison purposes. As such, the aforementioned techniques often result in the matching of very different images as having a correlation to one another, due in part by the limited amount or type of data used in the image comparison process.

It is therefore desirable to provide an image matching technique which can generate and utilize image data which is substantially representative of the entire images under comparison.

SUMMARY OF THE INVENTION

An embodiment of the present invention provides for a method of determining a correlation between images, wherein each image is represented by an image descriptor. Each image descriptor comprises a peak descriptor, a set of statistic descriptors, and a set of co-occurrence descriptors. Initially, a category associated with each image descriptor is determined. Provided the image descriptors belong to a common category, a difference value between select corresponding components of respective image descriptors is determined in accordance with an associated correlation protocol, the difference value representing the correlation between the images represented by respective image descriptors.

Another feature of the present invention provides a method of generating an image descriptor for use in image processing. Initially, image data is filtered to provide orientation data and energy data. Next, a first set of global information and local information is generated for the orientation data and a second set of global information and local information is generated for the energy data. Accordingly, descriptors are extracted from the respective sets of global information and local information associated with the orientation data and the energy data. The descriptors associated with the orientation data and the descriptors associated with the energy data are combined to form an image descriptor.

Yet another feature of the present invention provides for a computer software product for determining a correlation between images, wherein each image is represented by an image descriptor. Each image descriptor comprises a peak descriptor, a set of statistic descriptors, and a set of co-occurrence descriptors. Initially, a category associated with each image descriptor is determined. Provided the image descriptors belong to a common category, a difference value between select corresponding components of respective image descriptors is determined in accordance with an associated correlation protocol, the difference value representing the correlation between the images represented by respective image descriptors.

BRIEF DESCRIPTION OF THE DRAWINGS

The file of this patent contains at least one color drawing executed in color. Copies of this patent with color drawings will be provided by the Patent and Trademark Office upon request and payment of necessary fee.

The present invention is illustrated by way of example in the following drawings in which like references indicate similar elements. The following drawings disclose various embodiments of the present invention for purposes of illustration only and are not intended to limit the scope of the invention.

FIGS. 3A through 3B-2 and 3C through 3C and 3D-2 illustrate embodiments of different multi-band images along with the corresponding orientation maps, energy maps, histograms, matrices, and corresponding image descriptors, associated with each multi-band image.

FIGS. 4A through 4B-2 and 4C through 4D-2 illustrate embodiments of different multi-band images along with the corresponding orientation maps, energy maps, histograms, matrices, and corresponding image descriptors, associated with each multi-band image.

FIGS. 5A through 5B-2 and 5C through 5D-2 illustrate embodiments of different multi-band images along with the corresponding orientation maps, energy maps, histograms, matrices, and corresponding image descriptors, associated with each multi-band image.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Figure 1:
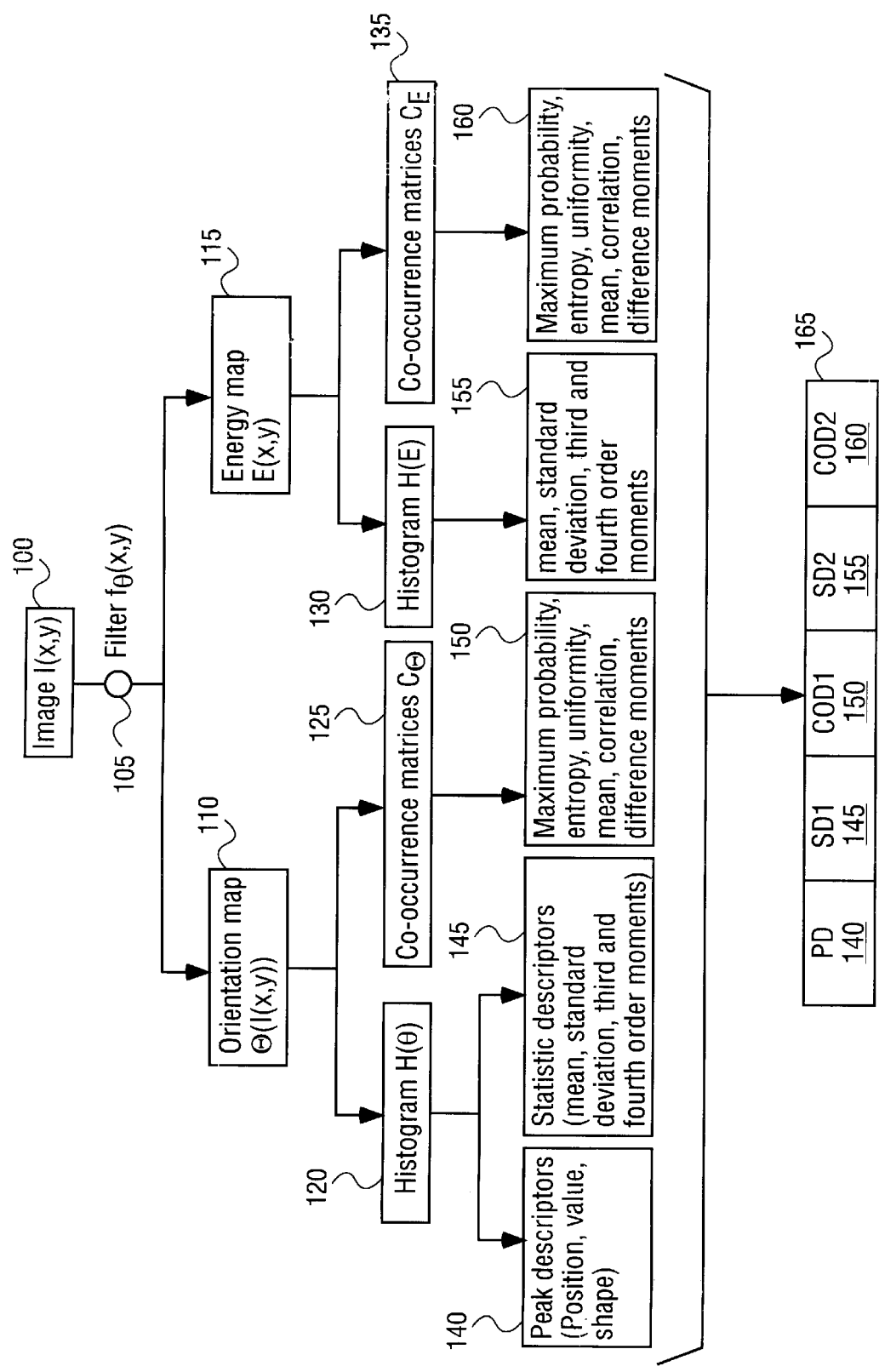
FIG. 1 illustrates an embodiment of a method for generating an multi-element image descriptor which is capable of implementing the teachings of the present invention.

FIG. 1 illustrates an embodiment of a method for generating an multi-element image descriptor which is capable of implementing the teachings of the present invention. Particularly, FIG. 1 illustrates, in block flow diagram format, a method of generating an image descriptor which is representative of a multi-band image for use in image processing.

Image features extracted from the output of spatial filters are often used for image representation. The application of multi-band images to spatial filters enables the construction of feature sets which contain a wide range of spectral and spatial properties. One such type of oriented spatial filter is the steerable filter, steerable filters obtain information about the response of a filter at any orientation using a small set of basis filters. In one embodiment, $$x^2 \exp\left(-\frac{x^2 + y^2}{2*\sigma^2}\right)$$

is chosen as the kernel of the steerable filter. Accordingly, for this kernel of information, a steerable filter at an arbitrary orientation θ can be synthesized using a linear combination of three basis filters according to $$h^\theta(x,y) = k_1(\theta)h^0(x,y) + k_2(\theta)h^{60}(x,y) + k_3(\theta)h^{120}(x,y),$$

where $$h^0(x, y) = x^2 \exp\left(-\frac{x^2 + y^2}{2*\sigma^2}\right),$$

$$h^{60}(x, y) = \left(\frac{1}{2}x + \frac{\sqrt{3}}{2}y\right)^2 \exp\left(-\frac{x^2 + y^2}{2*\sigma^2}\right),$$

$$h^{120}(x, y) = \left(-\frac{1}{2}x + \frac{\sqrt{3}}{2}y\right)^2 \exp\left(-\frac{x^2 + y^2}{2*\sigma^2}\right)$$

and $k_1(\theta) = 1 + 2\cos 2\theta$ $k_2(\theta) = 1 - \cos 2\theta + \sqrt{3}\sin 2\theta$ $k_3(\theta) = 1 = \cos 2\theta - \sqrt{3}\sin 2\theta$.

As illustrated in the embodiment of FIG. 1, an image [I(x,y)] 100 is applied to the steerable filter [Filter f θ(x,y)] 105 which provides two different matrices for each image, an orientation matrix 110 and an energy matrix 115. The orientation matrix 110, also referred to as an Orientation Map Θ (I(x,y)) 110, is derived by computing the dominant orientation at each pixel position (x,y) by using the equation:

$$\theta(x, y) = \frac{1}{2}\arctan\left(\frac{\sqrt{3}\,(E(60°)(x, y) - E(120°)(x, y))}{2E(0°) - E(60°) - E(120°)}\right).$$

Whereas, the energy matrix 115, also referred to as an Energy Map E(I(x,y)) 115, corresponds to the dominant orientation at each pixel position (x,y) in accordance with the equation:

$$E(x, y) = E(0°) + E(60°) + E(120°) + 2\sqrt{E^2(0°)} + E^2(60°) +$$

$$E^2(120°) - E(0°)(E(60°) + E(120°)) - E(60°)E(120°)$$

Accordingly, for each matrix or map, the Orientation Map Θ (I(x,y)) 110 and the Energy Map E (I(x,y)) 115, a corresponding histogram or set of histograms is used to represent global information, along with a set of co-occurence matrices which are used to represent local information. As such, the Orientation Map Θ (I(x,y)) 110 is represented as a corresponding orientation histogram H (θ) 120 and set of orientation co-occurence matrices C→ 125. Similarly, the Energy Map E (I(x,y)) 115 is represented as a corresponding energy histogram H(E) 130 and set of energy co-occurence matrices C$_E$ 135. Therefore, each image 100 is represented by a corresponding orientation histogram H(θ) 120, a set of orientation co-occurence matrices CΘ 125, a corresponding energy histogram H(E) 130, and a set of energy co-occurence matrices C$_E$ 135.

Next, a series of descriptors are extracted from each of the corresponding histograms and co-occurence matrices.

The descriptors extracted from the orientation histogram H(θ)120 of the Orientation Map Θ (I(x,y)) 110 are peak descriptors (PD) 140 and statistic descriptors (SD1) 145. The peak descriptors (PD) 140 comprise position, value, and shape data associated with the orientation histogram H(θ) 120. The statistic descriptors (SD1) 145 indicate mean, standard deviation, third and fourth order moments associated with the orientation histogram H(θ) 120. Select elements within the peak descriptors (PD) 140 are used to classify images into different categories, whereas the statistic descriptors (SD1) 145 are used to describe the shape of the orientation histogram H(θ) 120.

The descriptors extracted from the orientation co-occurence matrices CΘ 125 of the Orientation Map Θ (I(x,y)) 110 are co-occurence descriptors (COD1) 150. The co-occurence descriptors (COD1) 150 comprise maximum probability, entropy, uniformity, mean, correlation, and difference moments. The co-occurence descriptors (COD1) 150 in the present embodiment are computed in four different orientations (−45 Degrees, 0 Degrees, 45 Degrees, and 90 Degrees).

Correspondingly, the descriptors extracted from the energy histogram H(E) 130 of the Energy Map E (I(x,y)) 115 are statistic descriptors (SD2) 155. The statistic descriptors (SD2) 155 indicate mean, standard deviation, third and fourth order moments associated with the energy histogram H(E) 130. The statistic descriptors (SD2) 155 associated with the energy histogram H(E) 130 are used to describe the shape of the orientation energy histogram H(E) 130.

Likewise, the descriptors extracted from the energy co-occurence matrices CE 135 of the Energy Map E (I(x,y)) 115 are co-occurence descriptors (COD2) 160. The co-occurence descriptors (COD2) 160 comprise maximum probability, entropy, uniformity, mean, correlation, and difference moments. The co-occurence descriptors (COD2) 160 in the present embodiment are computed in four different orientations (−45 Degrees, 0 Degrees, 45 Degrees, and 90 Degrees).

Each of the descriptors associated with an image are combined in order to form a feature vector or image descriptor 165. As such, each individual descriptor 170 associated with an image comprises a peak descriptors (PD) 140, statistic descriptors (SD1) 145, co-occurence descriptors (COD1) 150, statistic descriptors (SD2) 155, and co-occurence descriptors (COD2) 160, which are combined to form an image descriptor 165. As such, the image descriptor 165 is a full representation of each image which may be used for image processing. For multi-band applications, an image descriptor 165 is generated for each information band comprising the multi-band image, as such, each information band associated with each multi-band image has a corresponding image descriptor 165. For instance, a multi-band image using the RGB color spectrum would have an individual image descriptor 165 for each information or color band (RGB) of the multi-band image.

Figure 2:
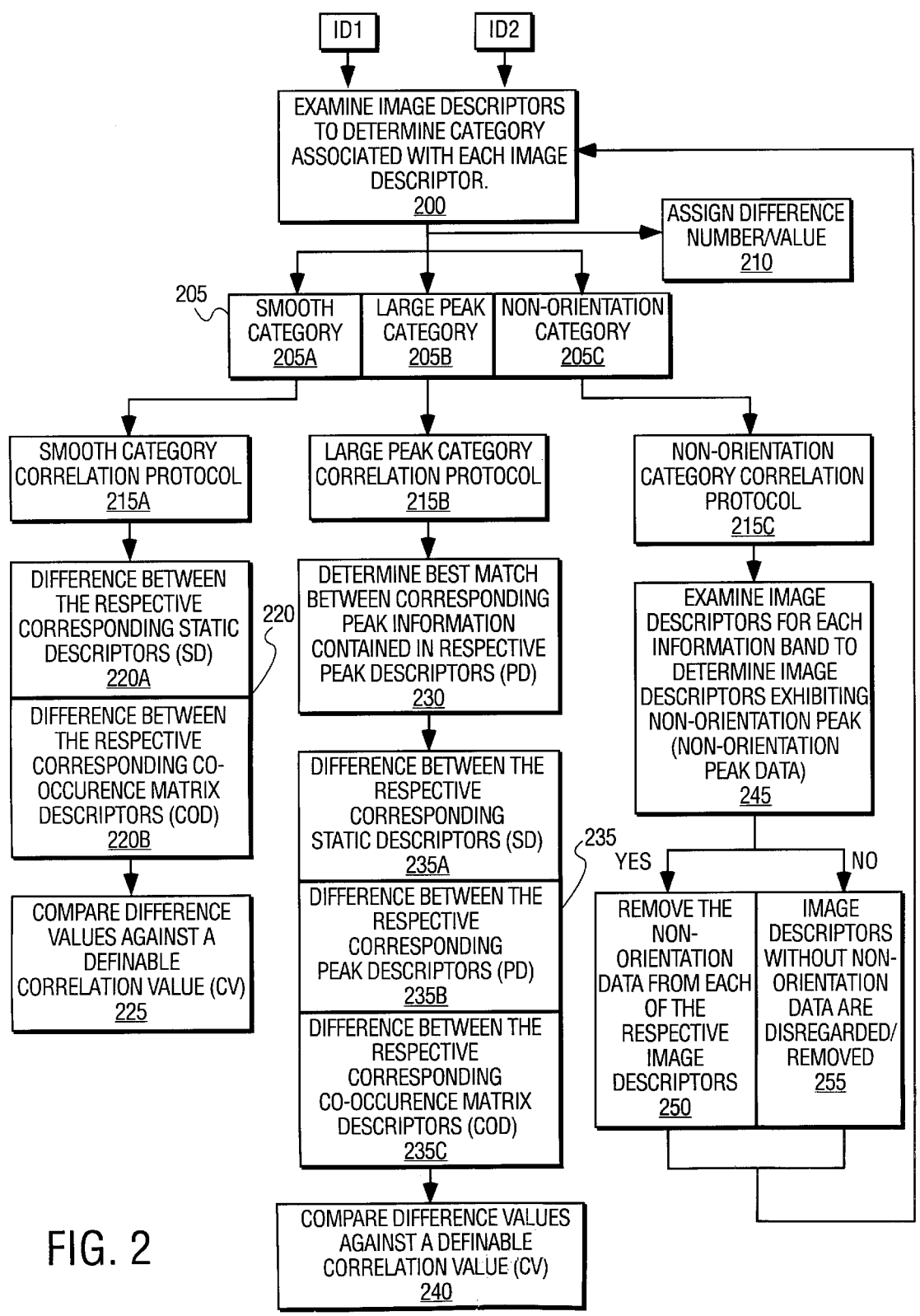
FIG. 2 illustrates an embodiment of a method of determining a correlation between images wherein each image is represented by an image descriptor.

FIG. 2, illustrates an embodiment of a method for determining a correlation between images, such as for example within the context of an imaging system, wherein each image is represented by an image descriptor. It is understood that for multi-band images, the image descriptor associated with each multi-band image is comprised of a series of individual image descriptors for each information band (e.g., color band) of the multi-band image. Further, the series of an individual image descriptors for each information band of a multi-band image may be represented as a single image descriptor containing the corresponding image description information for each information band of the multi-band image.

Initially, at Block 200, at least two image descriptors are received by the imaging system, a first image descriptor (ID1) and a second image descriptor (ID2) which correspond, respectively, to a first image and a second image. It is understood that multiple image descriptors could be received by the imaging system for simultaneous image processing, or alternately, a single image descriptor could be received by the image system for comparison against a database of images or image descriptors.

In an alternate embodiment, the actual images, rather then the image descriptors, may be supplied to Block 200, in which a transformation function is applied to each image, as described in relation to FIG. 1, wherein the actual images are transformed into corresponding image descriptors at Block 200.

Accordingly, at Block 200, each image descriptor associated with an image is examined in order to determine the corresponding image category associated with each image descriptor. Specifically, the descriptor elements within the peak descriptors (PD) of each image descriptor are examined to determine the image category associated with the image descriptor. As mentioned in relation to FIG. 1, the peak descriptors (PD) are comprised of position, value, and shape data associated with the orientation histograms H(θ) which are used to classify images into different image categories based upon the data contained in the peak descriptors. As such, the peak descriptors (PD) contained in the respective image descriptors associated with an image are used to categorize or classify each image descriptor, and thereby each image, as corresponding to a particular image category. In the present embodiment, the image categories are represented by a 'big peak category', a 'smooth category', and a 'non-orientation category'.

FIGS. 3A–3B-2, 3C–3D-2, 4A–4B-2, 4C–4D-2, 5A–5B-2 & 5C–5D-2 illustrate a series of different multi-band images along with the corresponding respective orientation maps and energy maps associated with each multi-band image. Likewise, FIGS. 3A–3B-2, 3C–3D-2, 4A–4B-2, 4C–4D-2, 5A–5B-2 & 5C–5D-2 also illustrate the corresponding histograms (0 Degrees to 181 Degrees) and matrices, in addition to the corresponding image descriptors, associated with each multi-band image. Each of the respective multi-band images have an associated image descriptor which describes the corresponding multi-band image, each image descriptor constituting a peak descriptor (PD), a statistic descriptor (SD1), a co-occurence descriptor (COD1), a statistic descriptor (SD2), and a co-occurence descriptor (COD2). Each image descriptor describes a particular image in accordance with the attributes associated with that particular individual image.

Further, in the present embodiment, each image descriptor associated with the multi-band images of FIGS. 3A–3B-2, 3C–3D-2, 4A–4B-2, 4C–4D-2, 5A–5B-2 & 5C–5D-2, may comprise a set of individual image descriptors, with each image descriptor corresponding to an individual information band of the multi-band image.

For instance, as illustrated by the multi-band images 300 of FIGS. 3–3B-2, & 3C–3D-2, human made structures, such as dwelling structures, tend to exhibit a large amount of regularity in the form of vertical and parallel lines and bars. Moreover, human made structures have a tendency to have fewer but stronger distinct orientations. As such, the corresponding representative orientation histograms H(θ) 305 for each information band 310 of the multi-band images 300 of FIGS. 3A–3B-2 & 3C–3D-2 are generally characterized by large peaks 315.

Correspondingly, the image descriptors 320 associated with each information band 310 of the multi-band images 300 of FIGS. 3A–3B-2 & 3C–3D-2, reflect the large peaks 315 within the individual informational data components constituting the corresponding image descriptors 320. As such, the corresponding image descriptors 320 associated with multi-band images 300 of FIGS. 3A–3B-2 & 3C–3D-2 contain image data characterizing the corresponding multi-band images 300 of FIGS. 3A–3B-2 & 3C–3D-2.

In FIGS. 3A–3B-2 & 3C–3D2, a representative orientation histogram H(θ) 305 and other related information (histograms/matrices) are illustrated for each information band 310 (e.g., RGB color bands) of the multi-band images 300 of FIGS. 3A–3B-2 & 3C–3D-2 . Likewise, the corresponding image descriptor 320 provided for each information band 310 of the multi band images 300 contain data corresponding to each representative orientation histogram H(θ) 305 and other related information associated with each information band 310. The representative orientation histograms H(θ) 305 corresponding to the multi-band images 300 of FIGS. 3A–3B-2 & 3C–3D-2 exhibit large peaks 315 along the different coordinates of the corresponding orientation histograms H(θ) 305. Correspondingly, the large peaks 315 represented in each representative orientation histogram H(θ) 305 are likewise represented in the corresponding image descriptors 320 associated with each corresponding information band 310 as large peak representative data. Accordingly, those image descriptors 320 which contain large peak representative data, corresponding to the large peaks 315 represented in each representative orientation histogram H(θ) 305, are classified into the large peak category.

Figure 3A:
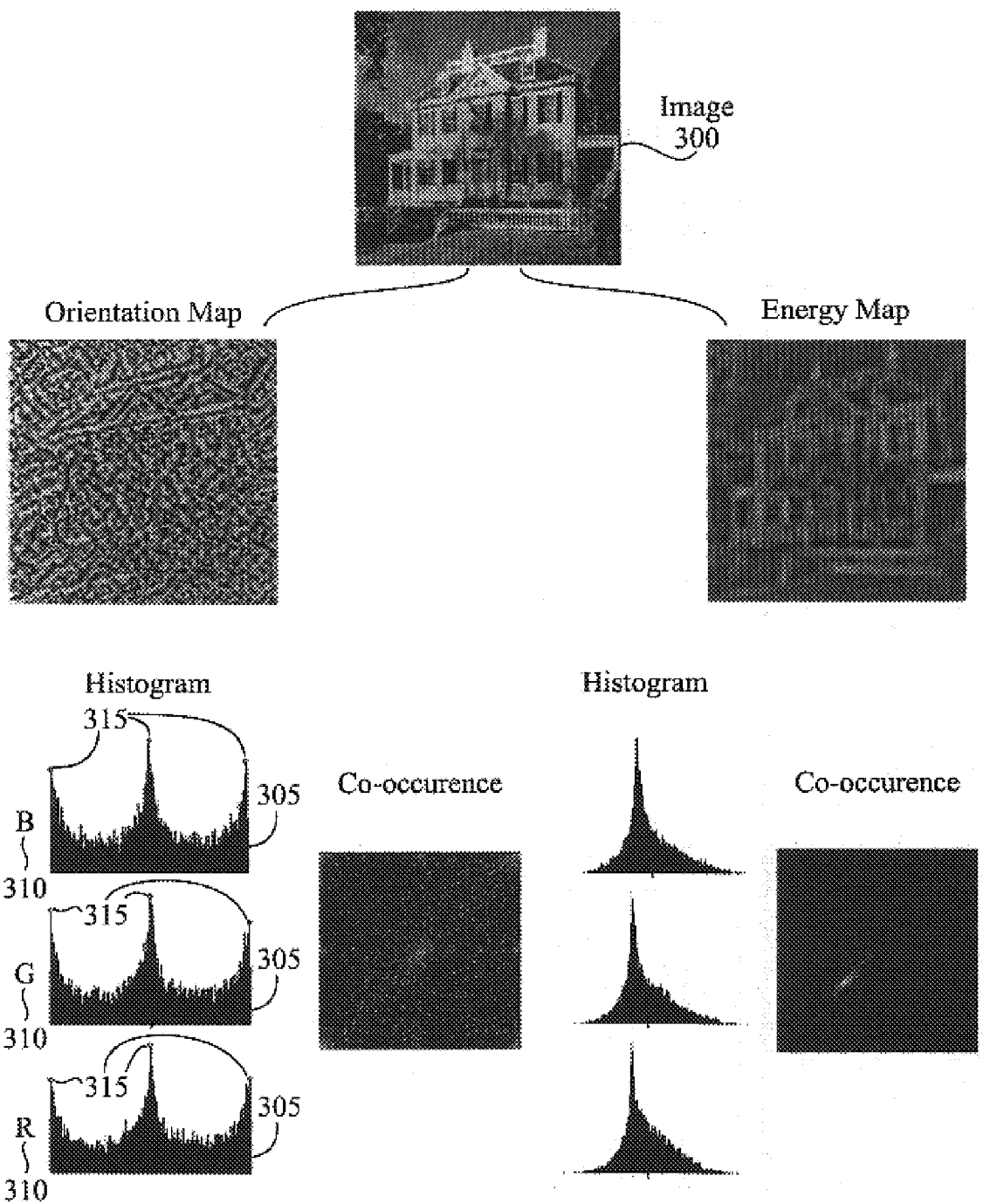
Figures 1, 3B:
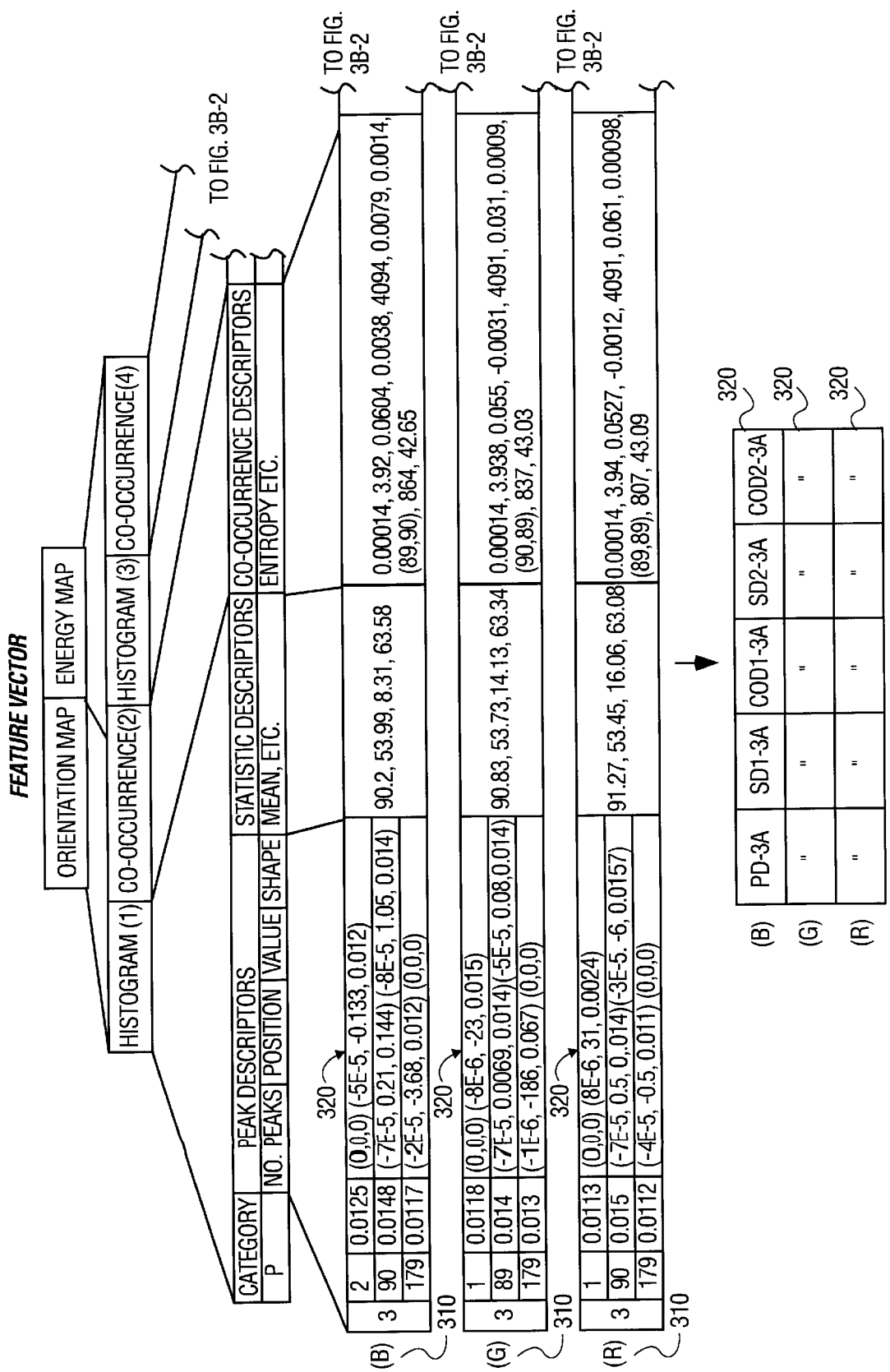
Figures 2, 3B:
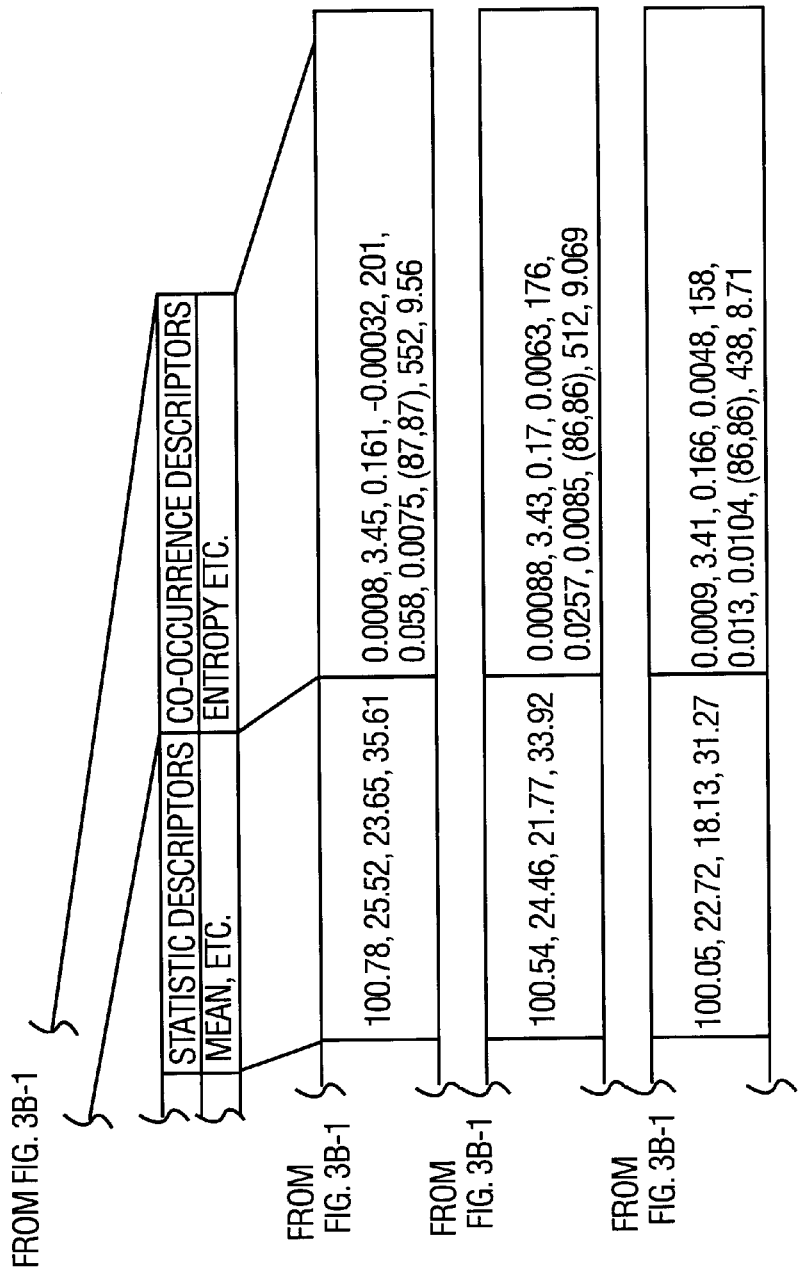
Figure 3C:
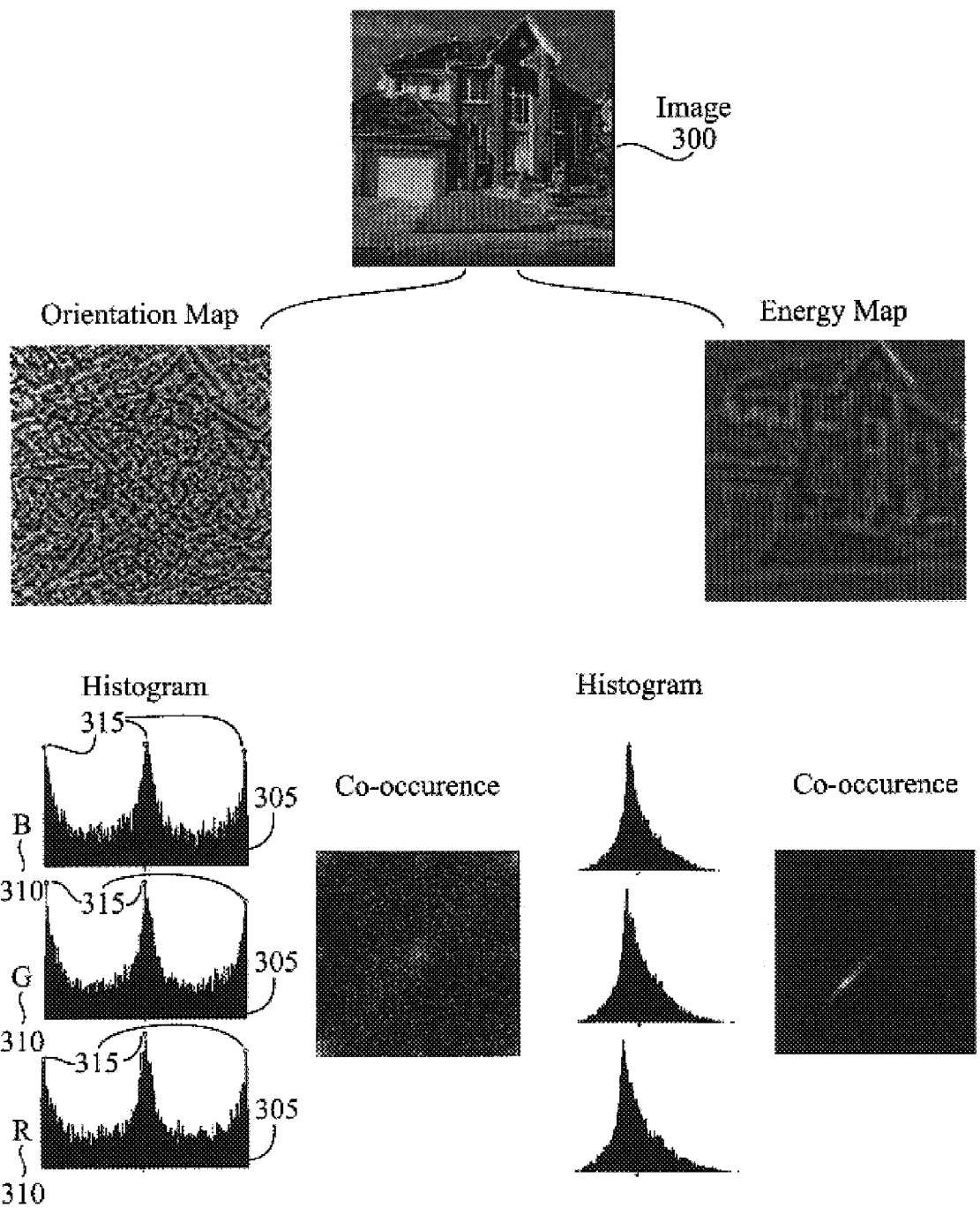

FIGS. 3A–3B-2, illustrate a multi-band image 300 of a house (i.e.-human made structure) which exhibits a large amount of regularity in the form of vertical and parallel lines and bars. Accordingly, the corresponding orientation histograms H(θ) 305, associated with each information band 310 of the multi-band image 300 of FIGS. 3A/B, exhibit large peaks 315 along different coordinates of the orientation histograms H(θ) 305. Correspondingly, the large peaks 315 represented in each representative orientation histogram H(θ) 305 are likewise represented in the corresponding image descriptors 320 associated with each corresponding information band 310 as large peak representative data. Accordingly, the image descriptors 320 which contain large peak representative data, corresponding to the large peaks 315 represented in each representative orientation histogram H(θ)) 305, are classified into the large peak category.

For instance, the orientation histogram H(θ) 305 associated with the (B) information band (e.g., blue color band) of FIGS. 3A–3B-2 exhibits a series of large peaks 315 along different coordinates (2 Degrees, 90 Degrees, and 179 Degrees) of the corresponding orientation histogram H(θ) 305, the series of large peaks 315 are likewise reflected in the corresponding image descriptor 320 at 2 Degrees, 90 Degrees, and 179 Degrees. Likewise, the orientation histogram H(θ) 305 associated with the (G) information band (e.g., green color band) of FIGS. 3A–3B-2 exhibits a series of large peaks 315 along different coordinates (1 Degree, 89 Degrees, and 179 Degrees) of the corresponding orientation histogram H(θ) 305, the series of large peaks 315 are likewise reflected in the corresponding image descriptor 320 at 1 Degree, 89 Degrees, and 179 Degrees. Further, the orientation histogram H(θ) 305 associated with the (R) information band (e.g., red color band) of FIGS. 3A–3B-2 exhibits a series of large peaks 315 along different coordinates (1 Degree, 90 Degrees, and 179 Degrees) of the corresponding orientation histogram H(θ) 305, the series of large peaks 315 are likewise reflected in the corresponding image descriptor 320 at 1 Degree, 90 Degrees, and 179 Degrees.

FIGS. 4A–4B-2 & 4C–4D-2 illustrate examples of natural images or nature scenes. Natural images or nature scenes, especially textures, as illustrated by the multi-band images 400 of FIGS. 4A–4B-2, & 4C–4D-2, tend to have their energy scattered in all directions. As such, the representative orientation histograms H(θ) 405, associated with each information band 410 of the multi-band images 400 of FIGS. 4A–4B-2 & 4C–4D-2, are generally characterized by a relatively smooth pattern along the different coordinates of the respective orientation histograms H(θ) 405. Accordingly, the relatively smooth pattern, represented in each of the representative orientation histograms H(θ) 405, is likewise represented in the corresponding individual image descriptors 415 for each corresponding information band 410 as smooth pattern representative data. Accordingly, image descriptors 415 which contain smooth pattern representative data, corresponding to the relatively smooth pattern represented in each representative orientation histograms H(θ) 405, are classified into a smooth category.

Figure 4A:
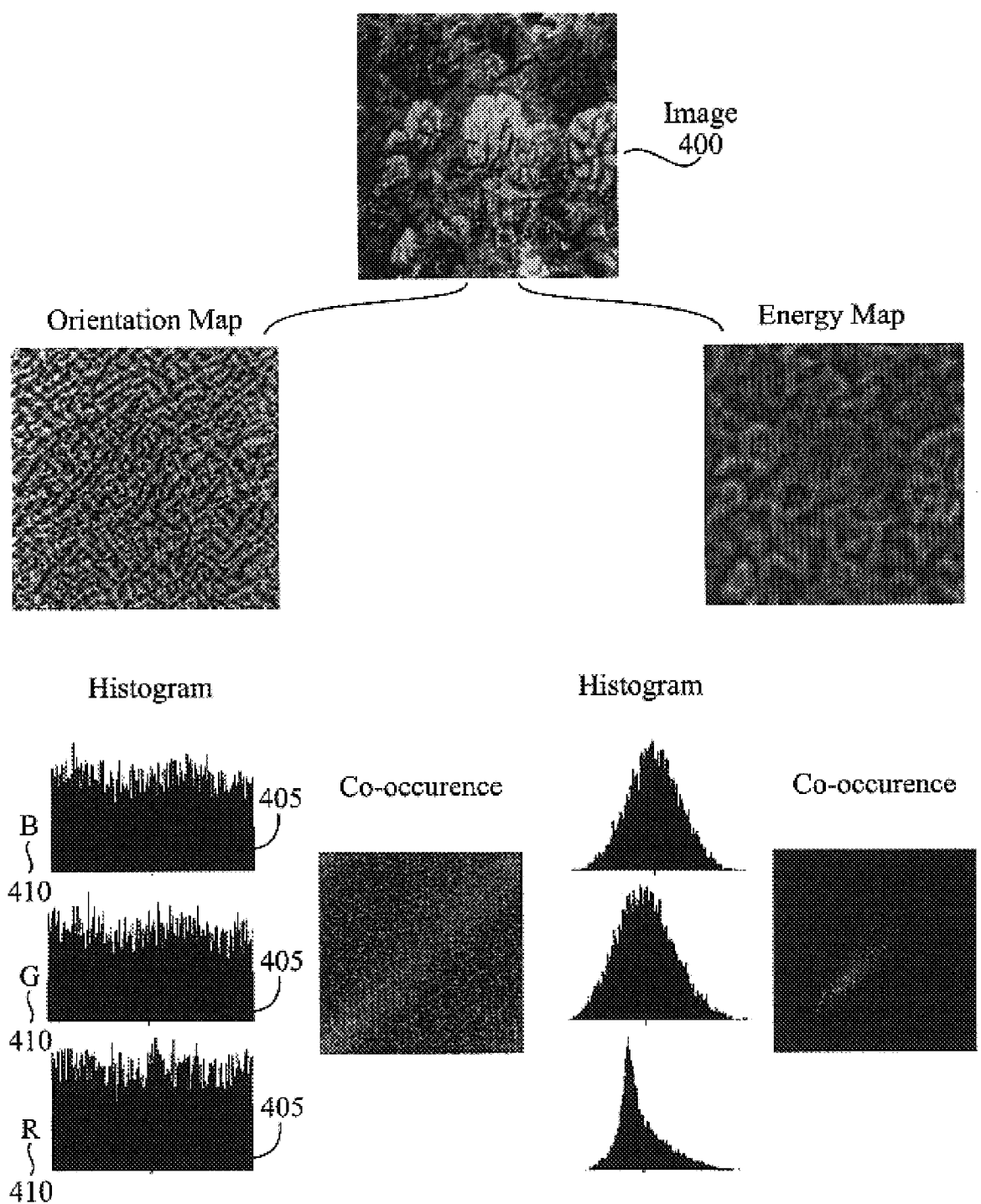
Figures 1, 4B:
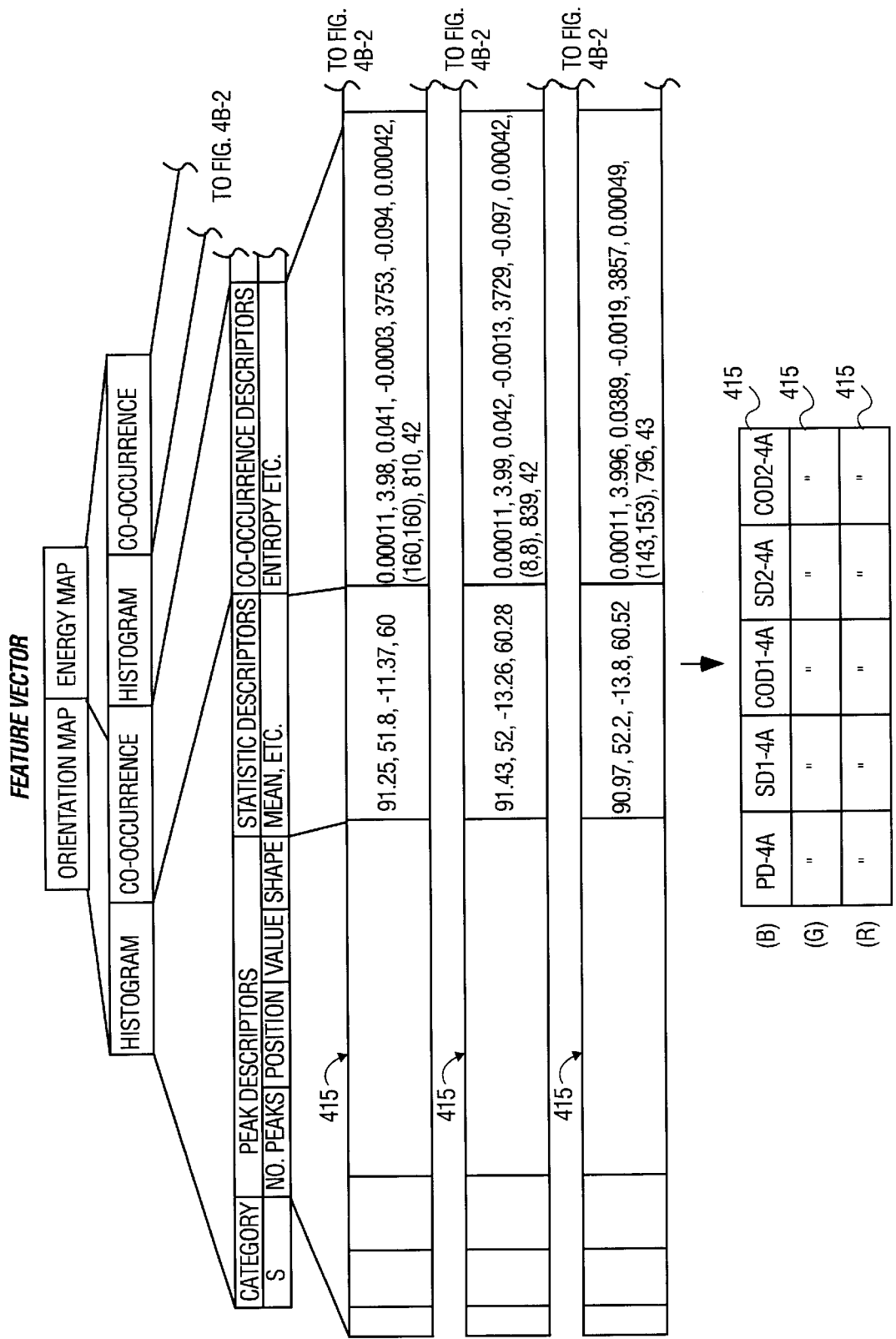
Figures 2, 4B:
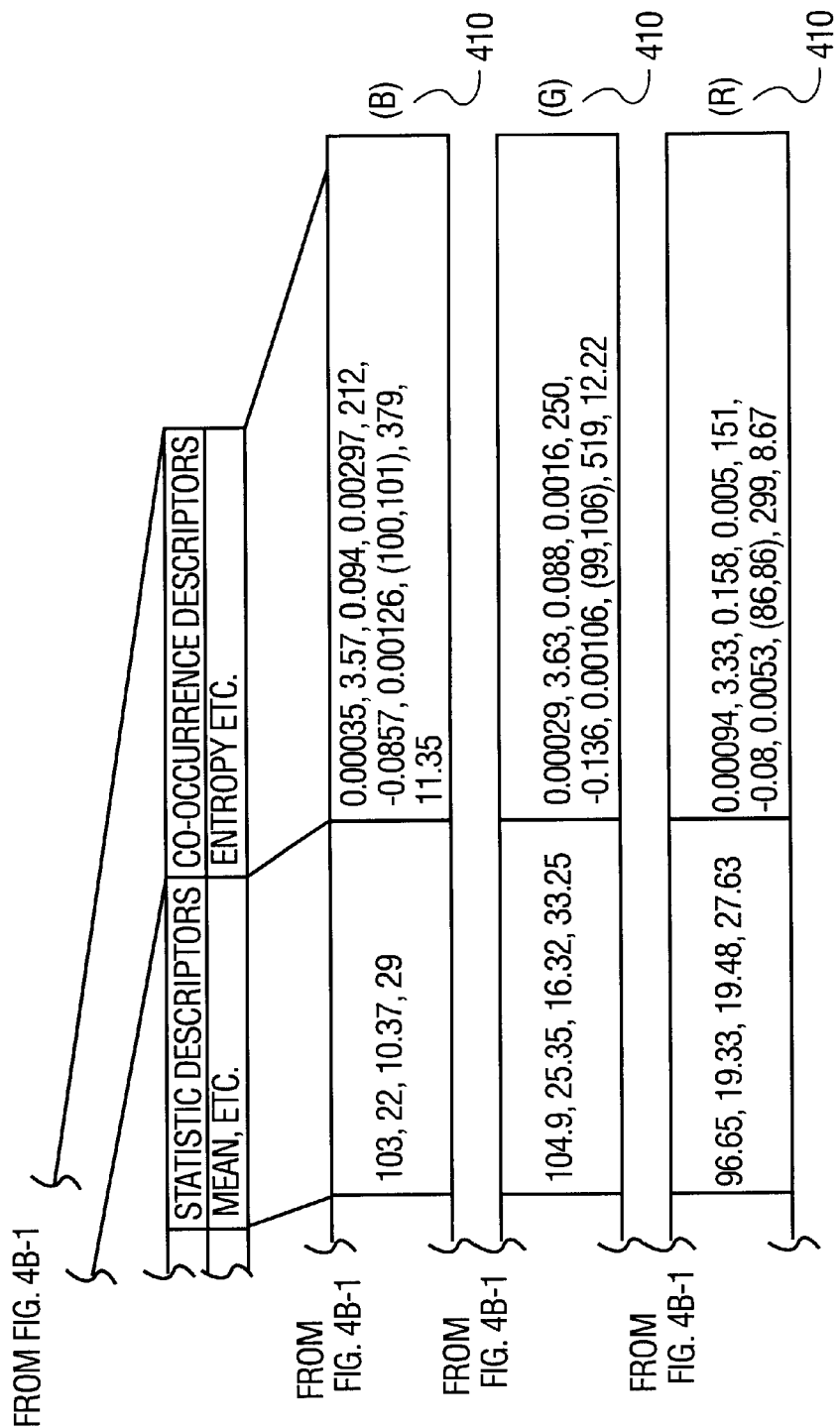
Figure 4C:
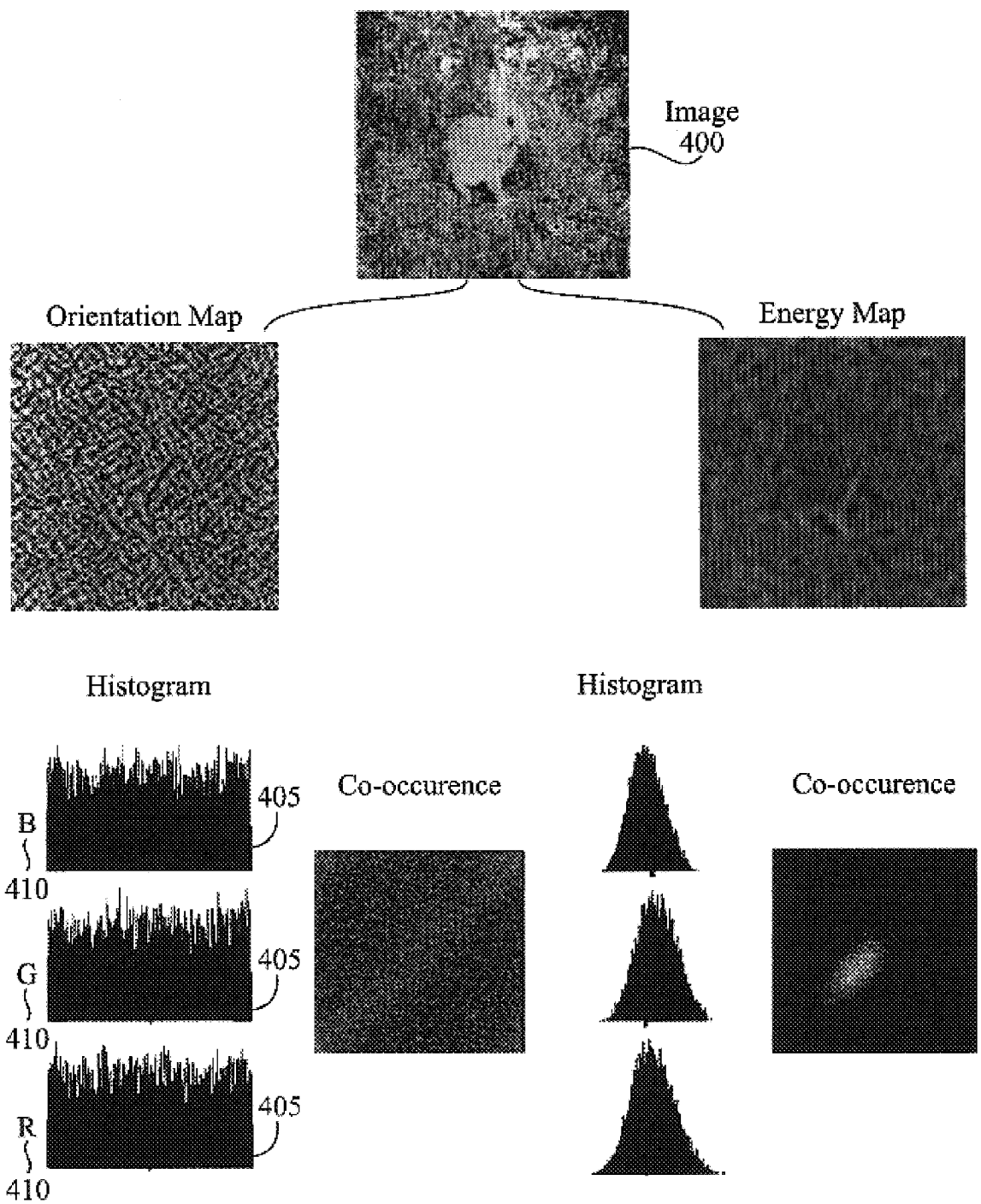

For instance, FIGS. 4A–4B-2 illustrates a multi-band image 400 of a nature scene (i.e., coral reef), which exhibits the associated characteristic of having the corresponding image energy scattered in all directions. Accordingly, the corresponding orientation histograms H(θ) 405, associated with each information band 410 of the multi-band image 400 of FIGS. 4A–4B-2, exhibit a relatively smooth pattern along the different coordinates of the orientation histograms H(θ) 405, identifying the multi-band image 400 as belonging to the smooth category. Correspondingly, the relatively smooth pattern represented in each of the representative orientation histograms H(θ) 405 is likewise represented in the corresponding image descriptors 415 of the corresponding information bands 410. Accordingly, image descriptors 415 which contain smooth pattern representative data, corresponding to the relatively smooth pattern represented in each representative orientation histograms H(θ) 405, are classified into a smooth category.

FIGS. 5A–5B-2, & 5C–5D-2 illustrate examples of images which possess general isotropic properties as a large proportion of the pixels contained in the respective images are generally isotropic. Isotropic images, such as a Mondrian picture or the multi-band images 500 of FIGS. 5A–5B-2 & 5C–5D-2, exhibit isotropic properties, as a large proportion of the pixels are generally isotropic. As such, at least one of the representative orientation histograms H(θ) 505, corresponding to the isotropic properties of the respective images 500, exhibits a large peak 510, also referred to as a non-orientation peak 510, in the position of a corresponding orientation histogram H(θ) 505 which is indexed as a "non-orientation area". In the present embodiment, the non-orientation area is assigned at the 181 Degree mark of the respective orientation histograms H(θ) 505.

Accordingly, the non-orientation peak 510, represented in the appropriate corresponding orientation histogram H(θ) 505, is likewise reflected in the corresponding individual image descriptor 515 for each corresponding information band 520 as non-orientation peak data. As such, image descriptors which contain non-orientation peak data, corresponding to the non-orientation peak 510 represented in each of the representative orientation histograms H(θ) 505, are classified into a non-orientation category.

Figure 5A:
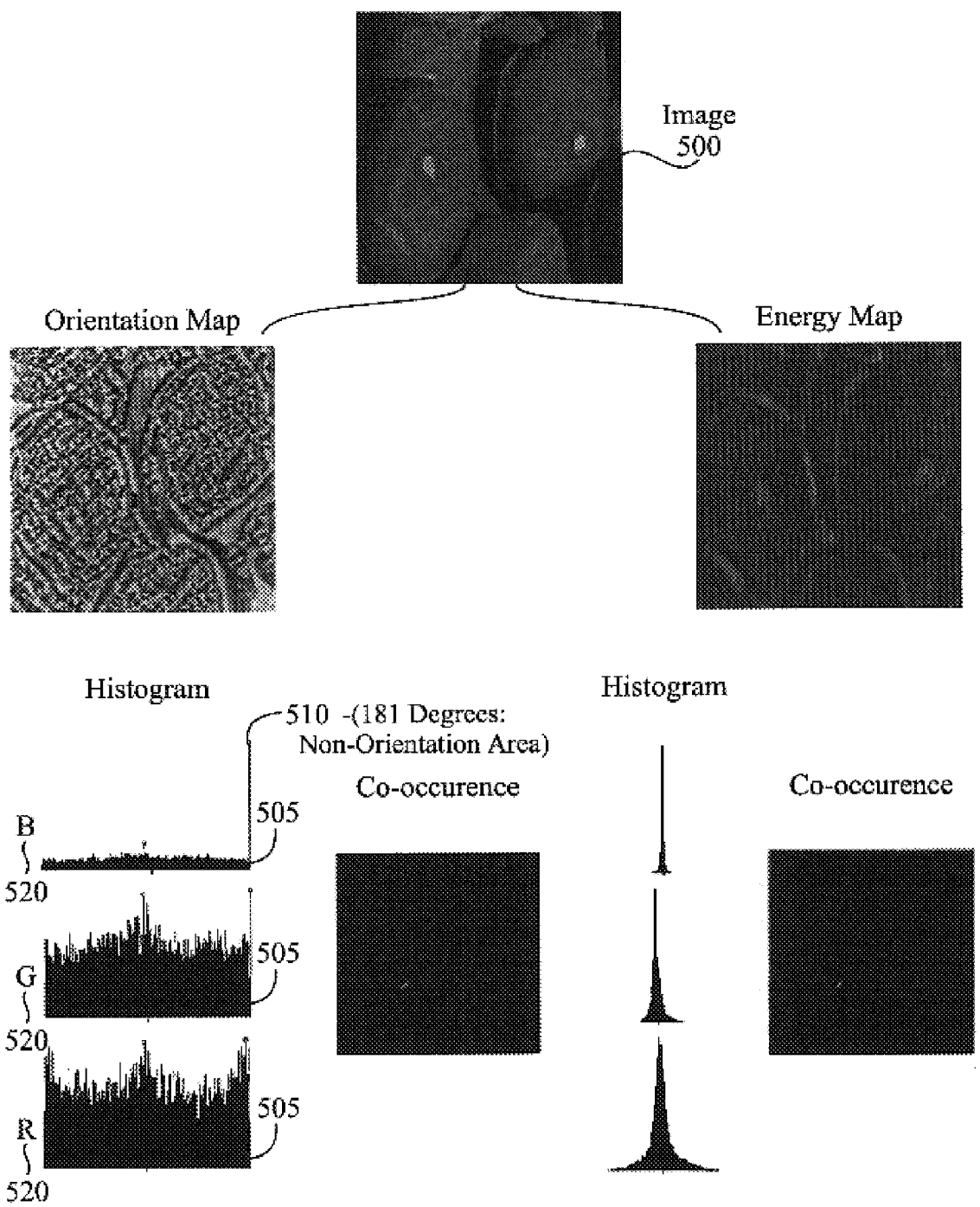
Figures 1, 5B:
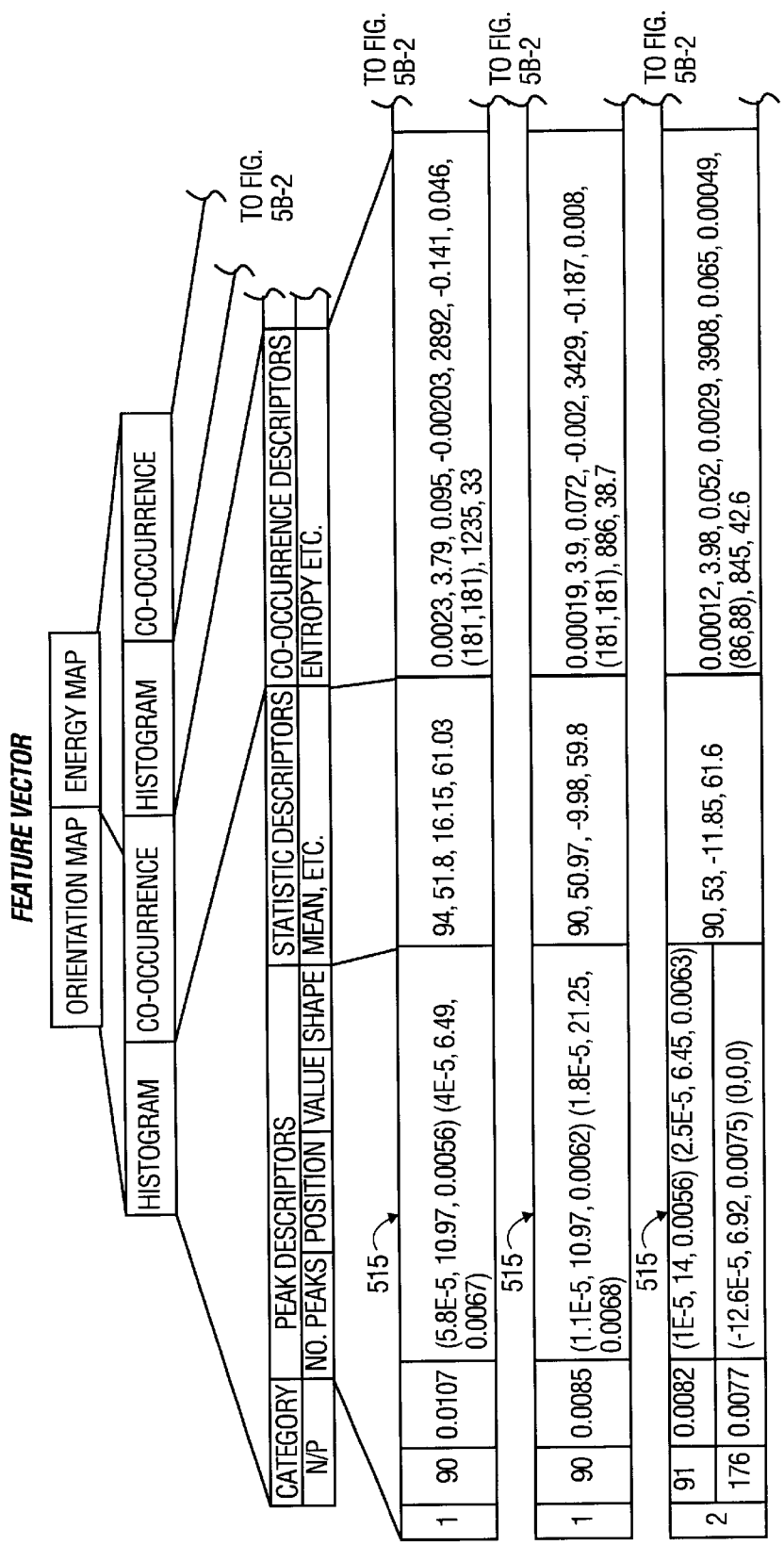
Figures 2, 5B:
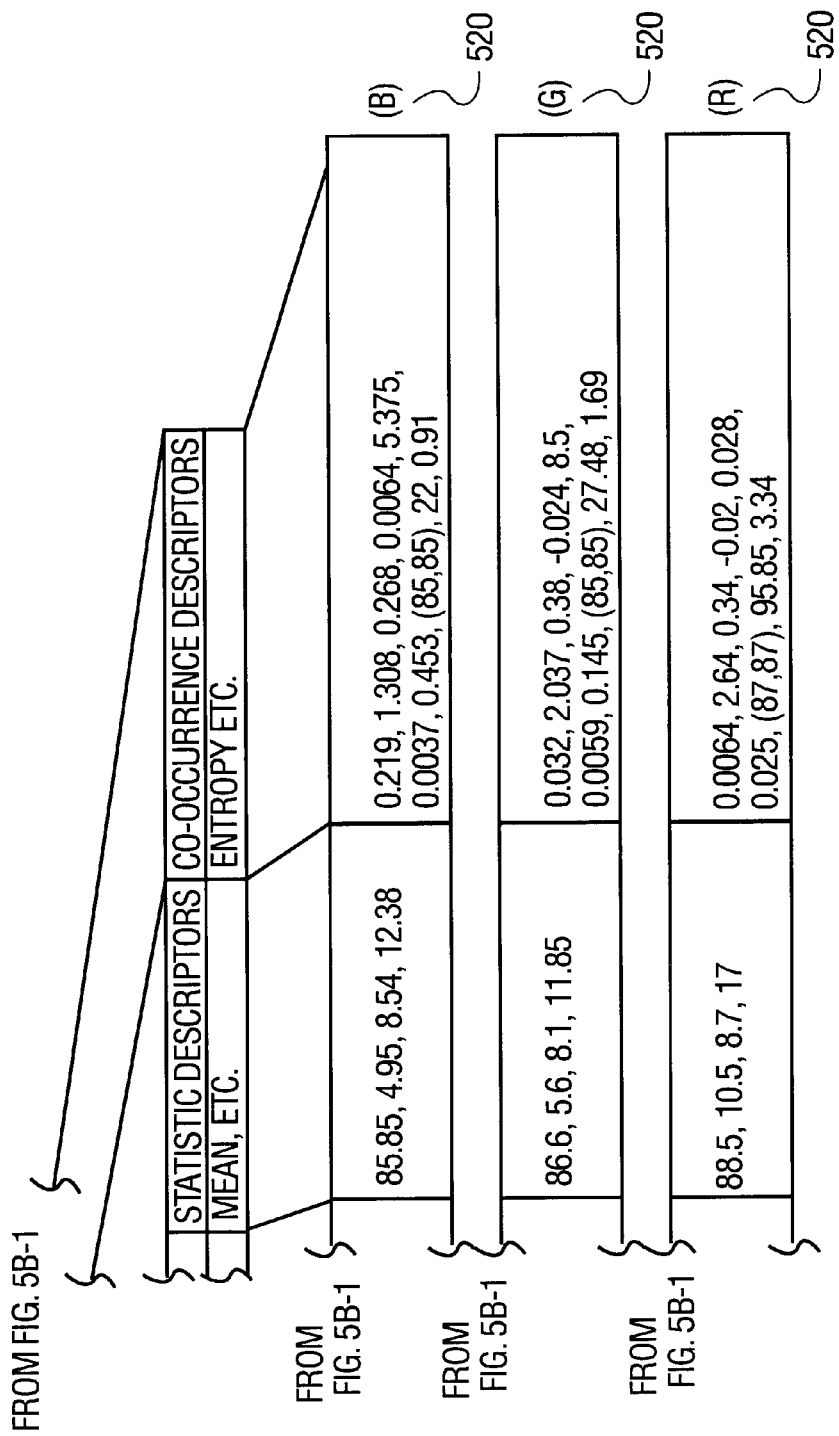
Figure 5C:
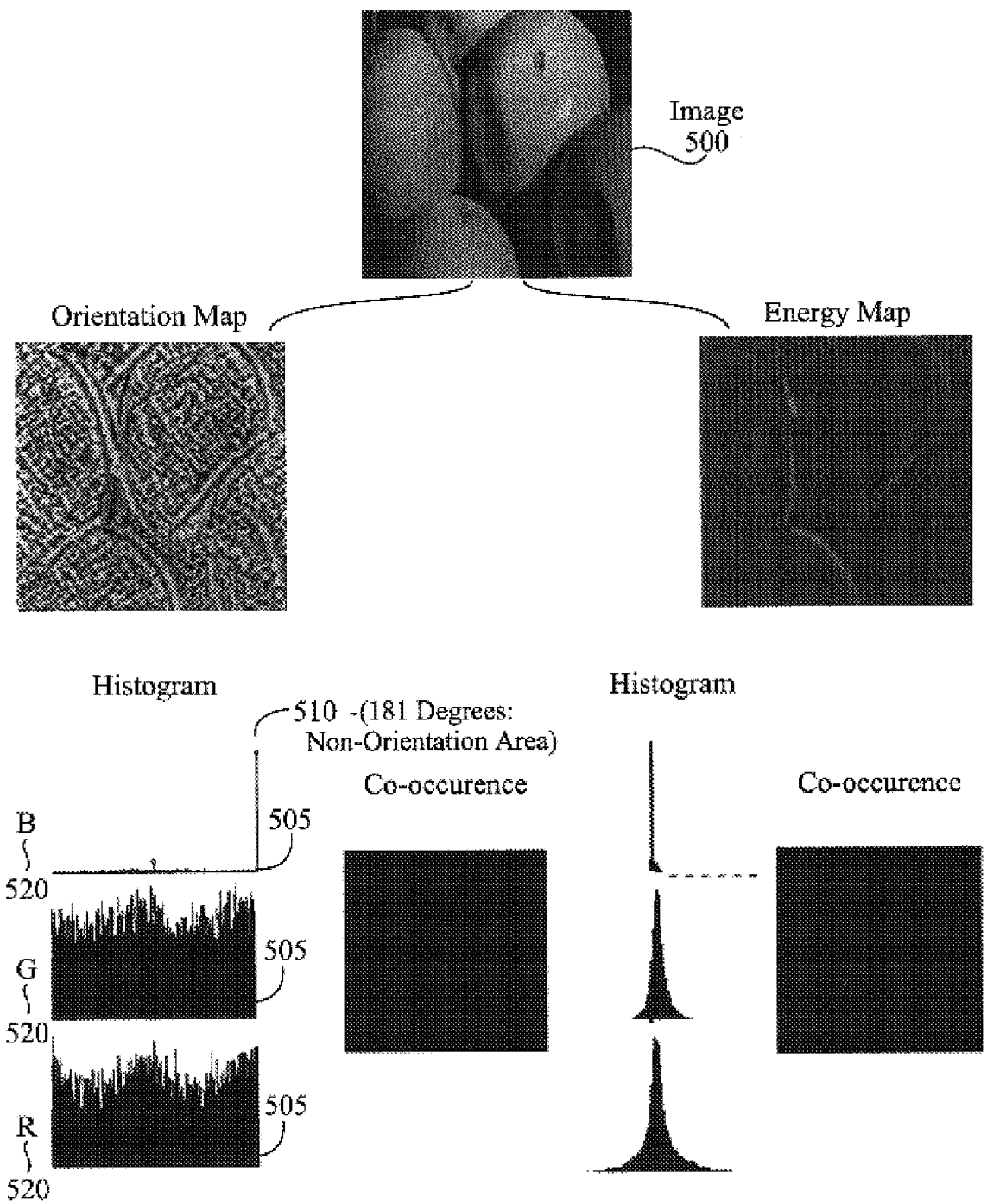
Figures 1, 5D:
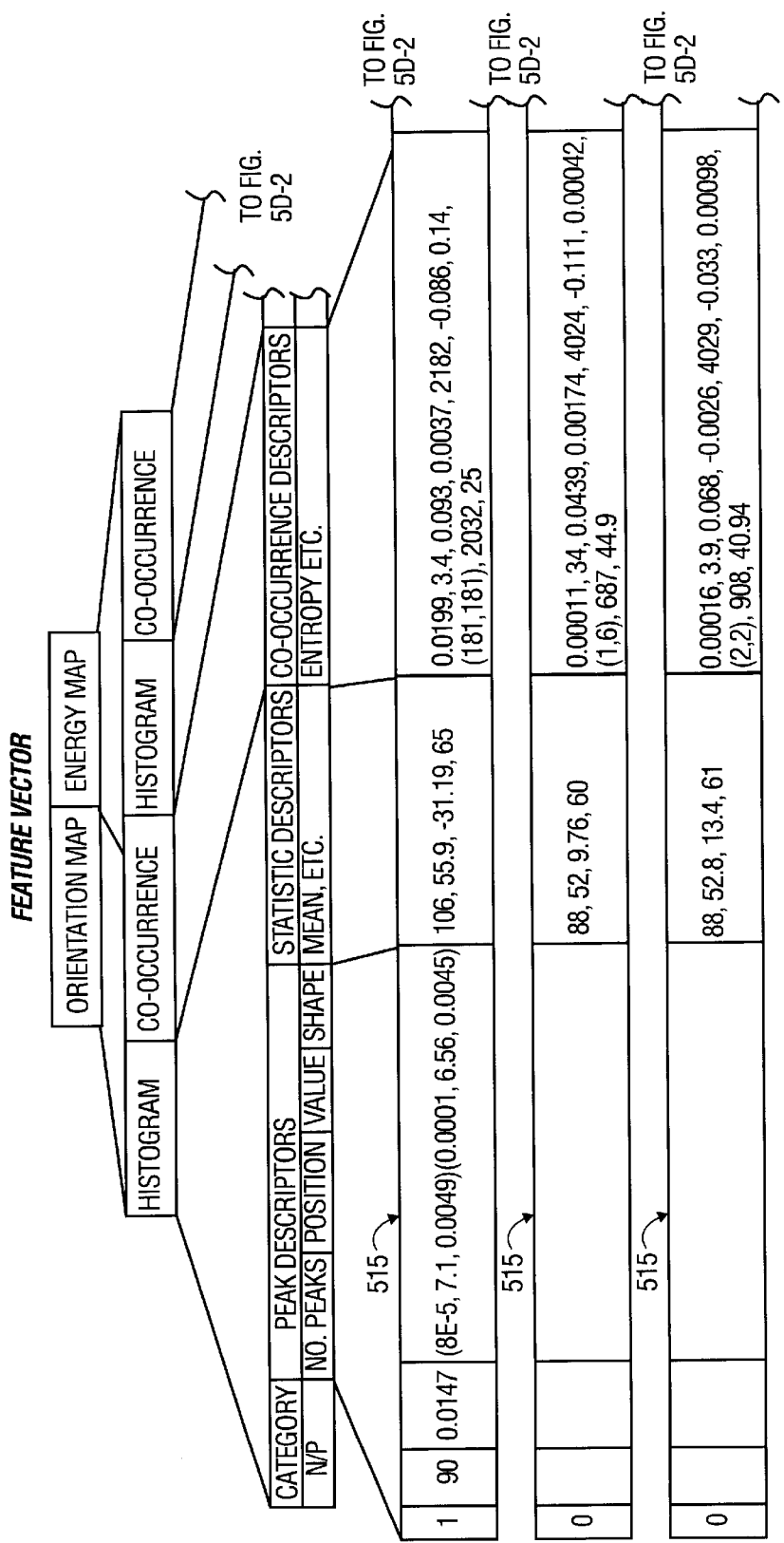
Figures 2, 5D:
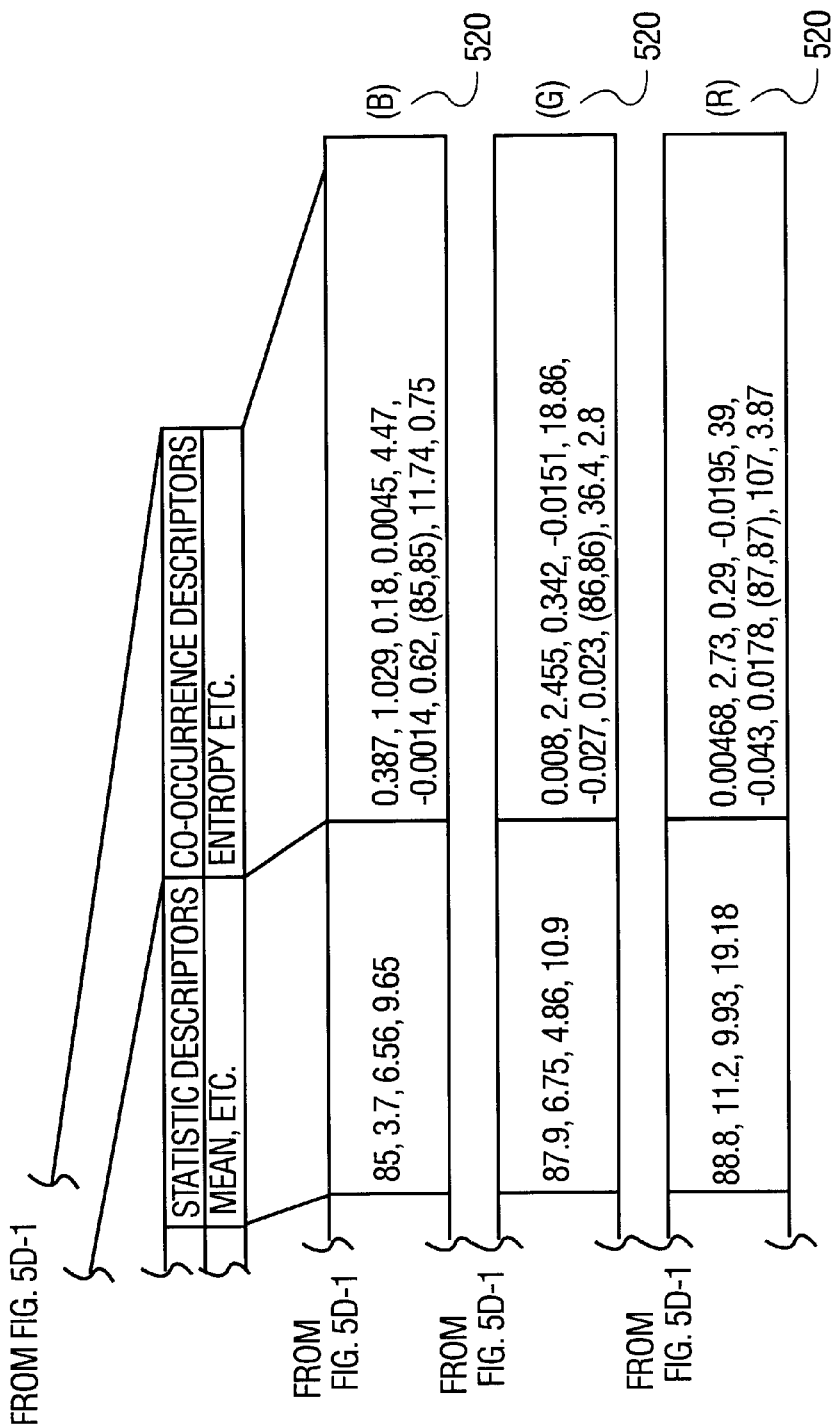

As illustrated by FIGS. 5A–5B-2 & 5C–5D-2, at least one orientation histogram H(θ) 505, associated with an information band 520 (e.g., color band) of the multi-band images 500, exhibits a non-orientation peak 510 in a position of the orientation histogram H(θ) 505 which is indexed as "non-orientation area". For example, the multi-band image 500 of FIGS. 5A–5B-2, illustrates an example of a generally isotropic image (e.g., image of fruit) exhibiting a non-orientation peak 510 in the position of the orientation histogram H(θ) 505 which is indexed as "non-orientation area" in two of the corresponding information bands 520, specifically, the blue and green color bands. As such, at least one of the orientation histograms H(θ) 505 associated with the multi-band image 500 of FIGS. 5A–5B-2 exhibits a non-orientation peak 510 in the position of the orientation histogram H(θ) which is indexed as "non-orientation area". Accordingly, the corresponding image descriptors 515, which contain corresponding non-orientation peak data, indicating a non-orientation peak 510 in the position of the orientation histogram H(θ) 505 indexed as "non-orientation area", are classified into a non-orientation category.

It is understood that a variety of different category types could be derived or instituted depending upon a specific or desired implementation of any categorization or image comparison scheme.

Returning back to Block 200, the respective image descriptors (ID1 and ID2) associated with each image are examined to determine whether the respective images, represented by image descriptors ID1 and ID2, belong to the same general category. As mentioned above, each image descriptor is associated with, or corresponds to, a particular category. For example, image descriptors corresponding to orientation histograms having a relatively smooth pattern are classified into a smooth category; image descriptors which are characterized by orientation histograms having large peaks are classified into a large peak category; and images descriptors which correspond to orientation histograms exhibiting a large peak in the position of the orientation histogram which is indexed as the "non-orientation area" are classified into a non-orientation category.

Accordingly, each image descriptor associated with an image is analyzed to determine the respective category associated with each image descriptor. Provided the respective image descriptors, ID1 and ID2, being compared belong to the same category type, the respective image descriptors are then forwarded to Block 205 in order to be processed in accordance with the category type associated with the respective image descriptors. As such, in the present embodiment, three different image category groups are provided at Block 205, a smooth category 205A, a large peak category 205B, and a non-orientation category 205C.

In the event that the image descriptors being compared to each other do not belong within the same category type, a difference number is assigned at Block 210 which indicates that the representative image descriptors being compared belong to different respective categories. As such, the assigned difference number indicates that the proffered image descriptor (ID2) and the reference image descriptor (ID1) are associated with different category types. Accordingly, the magnitude of the difference number reflects the magnitude of a correlation difference between the proffered image descriptor (ID2) and the reference image descriptor (ID1). Therefore, a large correlation difference number between the respective image descriptors (ID1 and ID2) would indicate a large image difference between the respective image descriptors, and a small correlation difference number between image descriptors would indicate a small image difference between the image descriptors.

Returning back to Block 205, provided the image descriptors belong to the same category type, the image descriptors are processed in accordance with a correlation protocol associated with the particular category type associated with the image descriptors. As such, three different correlation protocols are provided, a smooth category correlation protocol 215A, a large peak category correlation protocol 215B, and a non-orientation category correlation protocol 215C, which correspond to the three different image category groups of the present embodiment.

Image descriptors which are classified into the smooth category, as illustrated by Block 205A, are analyzed in accordance with the smooth category correlation protocol 215A. The smooth category correlation protocol 215A assists in determining a correlation between the image descriptors represented within the smooth category. Select elements associated with a first image descriptor (ID1) are compared against select corresponding elements of a second image descriptor (ID2) in order to determine if there is a correlation between the image descriptors (ID1 and ID2) represented in the smooth category.

As illustrated by Block 220, the difference between select corresponding elements of each image descriptor in the smooth category is determined in order to assist in determining a correlation between the image descriptors, and thereby the images themselves. Initially, in Block 220A, the difference between the respective corresponding statistic descriptors (SD) associated with the first image descriptor (ID1) and second image descriptor (ID2) is determined. Next, in Block 220B, the difference between the respective corresponding co-occurence matrix descriptors (COD) associated with the first image descriptor (ID1) and second image descriptor (ID2) is determined.

Accordingly, at Block 225, the difference between the statistic descriptors (SD) of the image descriptors (ID1 and ID2) and the difference between the co-occurence matrix descriptors (COD) are compared against a definable correlation value (CV) which indicates whether the difference between the respective select elements of the image descriptors is of a magnitude which indicates a correlation between the image descriptors, and thereby a correlation between the images themselves. The definable correlation value (CV) may be defined in accordance with the preferences of a particular user or imaging system in order to customize the sensitivity of the image comparison/correlation process.

In the smooth category, the calculation of the difference between the statistic descriptors (Block 220A) and the co-occurence matrix descriptors (Block 220B), associated with the respective image descriptors, is further illustrated by example through the use of the multi-band images of FIGS. 4A–4B-2 & 4C–4D-2.

Figures 1, 4D:
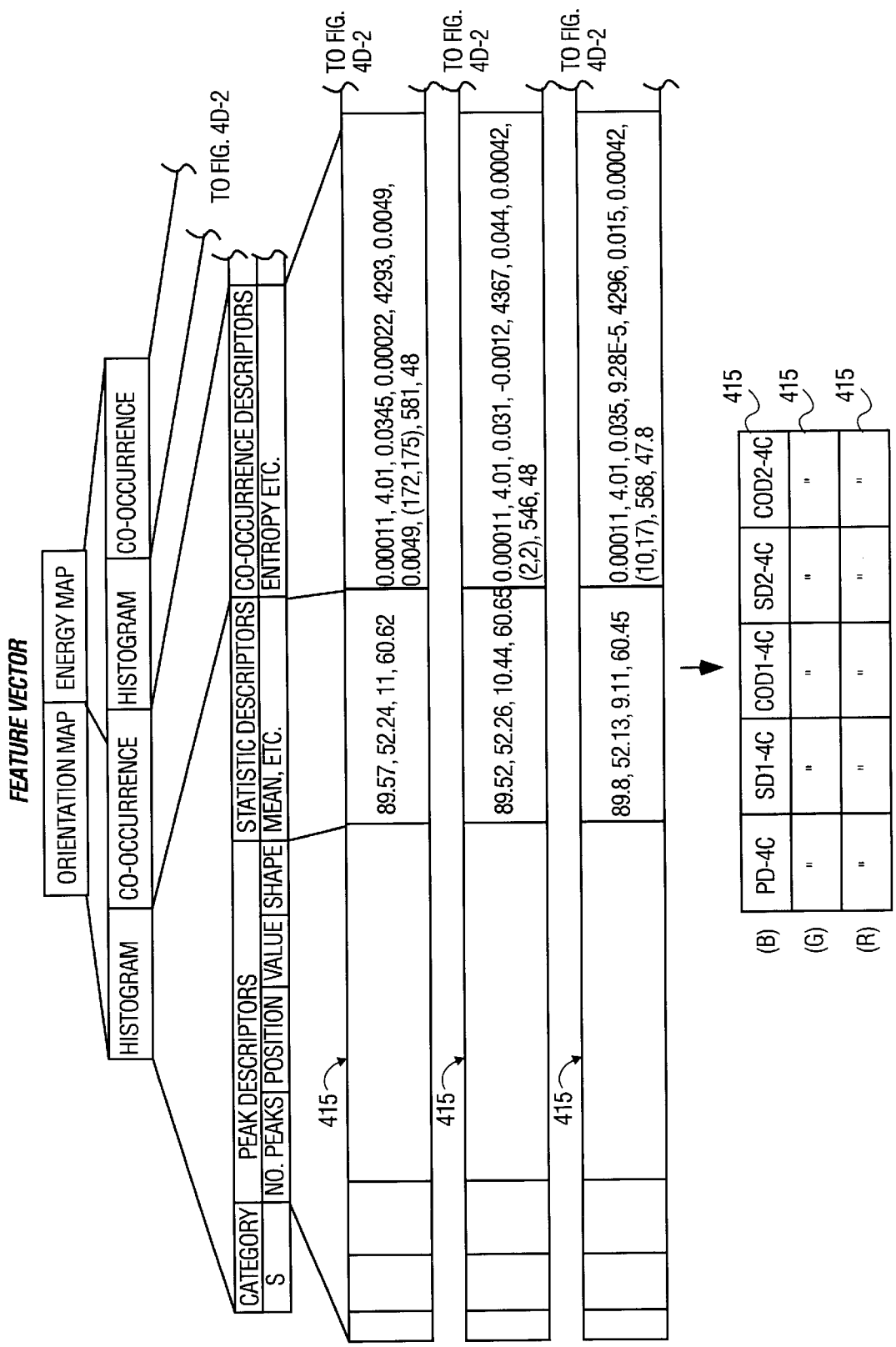
Figures 2, 4D:
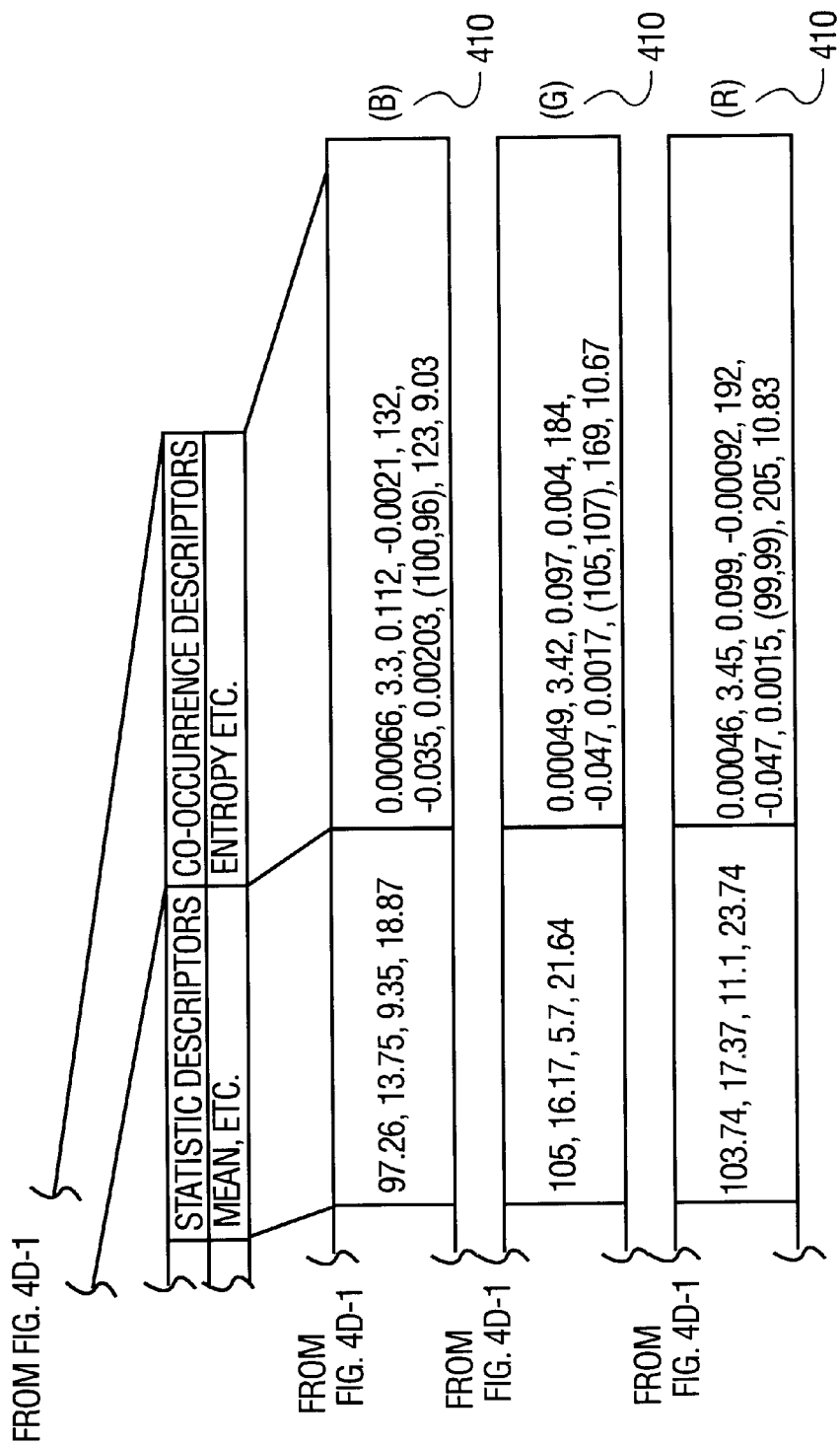

As illustrated In FIGS. 4B-1 & 4D-2, the individual image descriptor associated with each information band of the multi-band image of FIG. 4A, comprises peak descriptors (PD-4A), statistic descriptors (SD1-4A), co-occurence descriptors (COD1-4A), statistic descriptors (SD2-4A), and co-occurence descriptors (COD2-4A), with an identifier of R, G, or B, identifying the corresponding individual image descriptor associated with each information band of the multi-band image. Similarly, as illustrated in FIGS. 4D-1 & 4D-2, the individual image descriptor associated with each information band of the multi-band image of FIG. 4C, comprises peak descriptors (PD-4C), statistic descriptors (SD1-4C), co-occurence descriptors (COD1-4C), statistic descriptors (SD2-4C), and co-occurence descriptors (COD2-4C), with an identifier of R, G, or B, identifying the corresponding individual image descriptor associated with each information band of the multi-band image.

Accordingly, the difference between the respective corresponding statistic descriptors (SD) associated with each image descriptor for each corresponding information band of the multi-band image is determined, wherein the difference is determined by the following calculation for each information band (R, G, and B) of the multi-band image: [(SD1-4A)-(SD1-4C)]+[(SD2-4A)-(SD2-4C)]. Similarly, the difference between the respective co-occurence matrix descriptors associated with each image descriptor for each corresponding information band of the multi-band image is determined, wherein the difference, is determined by the following calculation for each information band (R, G, and B) of the multi-band image: [(COD1-4A)-(COD1-4C)]+ [(COD2-4A)-(COD2-4C)].

Accordingly, for each respective information band, the difference between the respective statistic descriptors (SD) and the difference between the respective co-occurence matrix descriptors (COD) of each image descriptor is compared to a definable correlation value (CV). The definable correlation value (CV) assists in indicating whether there is a correlation between the image descriptors, and therefore a correlation between the images themselves. Accordingly, based upon the magnitude of the difference between the respective elements (SD and COD) of the respective image descriptors as compared against the definable correlation value (CV), a correlation is either accomplished or not accomplished. Provided the difference between the respective elements (SD and COD) of the respective image descriptors is less than the definable correlation value (CV), a correlation is achieved. Otherwise, provided the difference between the respective elements (SD and COD) of the respective image descriptors is greater than the definable correlation value (CV), a correlation is not achieved (non-correlation).

Image descriptors which are classified into the large peak category, as illustrated by Block 205B, are analyzed in accordance with the large peak category correlation protocol 215B. The large peak category correlation protocol 215B assists in determining a correlation between the image descriptors represented within the large peak category. Select elements associated with a first image descriptor (ID1) are compared against select corresponding elements of a second image descriptor (ID2) in order to determine if there is a correlation between the image descriptors (ID1 and ID2) represented in the large peak category. Accordingly, the determination of a correlation between images, described by image descriptors ID1 and ID2, within the large peak category is determined by examining the image descriptors associated with each image.

Initially, at Block 230, each image descriptor is examined in order to determine the best match between corresponding peak information contained in the peak descriptor (PD) information of each image descriptor (ID1 and ID2) being compared. Specifically, the peak descriptor (PD) information contained in each image descriptor for each information band comprising the multi-band image is examined in order to determine the best match between corresponding peak information contained in the respective peak descriptor (PD) information of each image descriptor. As such, the peak descriptor (PD) information for each information band of the first image descriptor ID1 is compared against the corresponding peak descriptor (PD) information for each corresponding information band of the second image descriptor ID2 in order to determine the best match between the peak information contained in the respective peak descriptors (PD). Some peak information, such as minor peaks due to noise or interference, may be filtered out or ignored when determining the best match between peak information.

A variety of different techniques may be used to determine the best match between peak information, such as, but not limited to, a signal matching algorithm, signal pattern matching computer program, or other mathematical determination technique. Once the best match between peak information of the respective peak descriptors (PD) is determined, select components of the corresponding image descriptors (ID1 and ID2), which have satisfied the best match between peak information, are analyzed in order to determine if there is a correlation between the respective images described by the corresponding image descriptors (ID1 and ID2).

Accordingly, at Block 235, select corresponding elements of each image descriptor (ID1 and ID2) within the big peak category are compared against each other in order to determine whether there is a correlation between the respective image descriptors in the big peak category. Specifically, select elements of the first image descriptor (ID1) for each information band of the first multi-band image are compared against select corresponding select elements of the second image descriptor (ID2) for each corresponding information and of the second multi-band image, in order to determine if there is a correlation between the respective image descriptors (ID1 and ID2) represented in the large peak category. The difference between the select elements of the respective image descriptors for each information band of the respective multi-band images are used in order to determine if there is a correlation between the image descriptors (ID1 and ID2) represented in the large peak category.

Specifically, as illustrated by Block 235, the difference between select corresponding elements of each image descriptor for each information band are determined in order to assist in the determination of a correlation between images descriptors, and therefore the images themselves. Initially, at Block 235A, the difference between the respective corresponding statistic descriptors (SD) for each corresponding information band associated with the first image descriptor (ID1) and the second image descriptor (ID2) is determined. Next, at Block 235B, the difference between the respective corresponding peak descriptors (PD) for each corresponding information band associated with the first image descriptor (ID1) and second image descriptor (ID2) is determined. Finally, at Block 235C, the difference between the respective corresponding co-occurence matrix descriptors (COD) for each corresponding information band associated with the first image descriptor (ID1) and second image descriptor (ID2) is determined.

Accordingly, at Block 240, the difference between the statistic descriptors (235A) of the image descriptors (ID1 and ID2), the difference between the peak descriptors (235B) of the image descriptors (ID1 and ID2), and the difference between the co-occurence matrix descriptors (235C) of the image descriptors (ID1 and ID2) are compared to a definable correlation value (CV) which indicates whether the difference between the respective select elements of the respective image descriptors is of a magnitude which indicates a correlation between the image descriptors, and thereby a correlation between the images themselves. The definable correlation value (CV) may be defined in accordance with the preferences of a particular user or imaging system in order to customize the sensitivity of the image comparison/correlation process.

The calculation of the difference between the statistic descriptors (SD), peak descriptors (PD), and the co-occurence matrix descriptors (COD) of each image descriptor is further illustrated by example through the use of the multi-band images of FIGS. 3A–3B-2 & 3C–3D-2.

Figures 1, 3D:
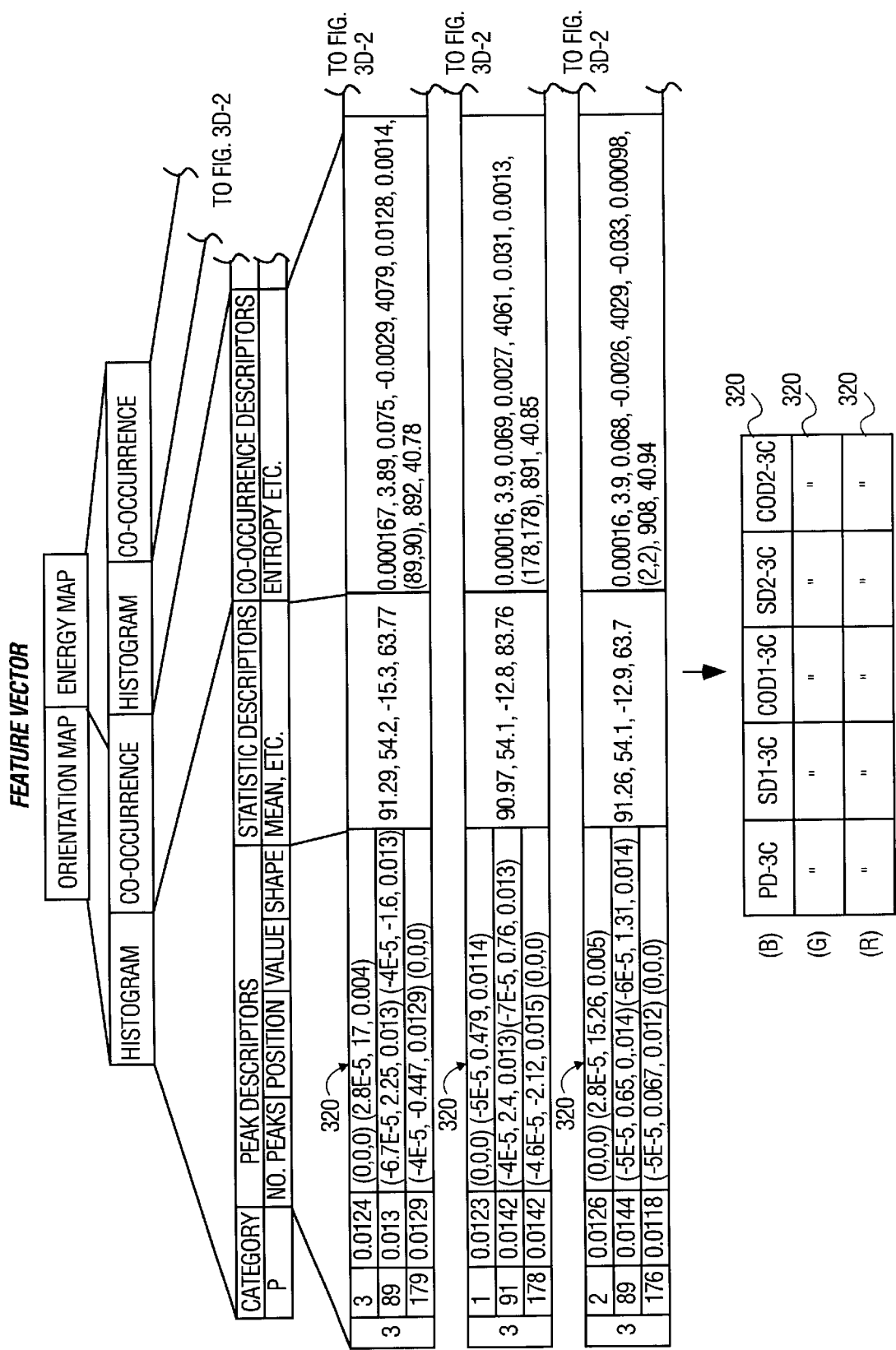
Figures 2, 3D:
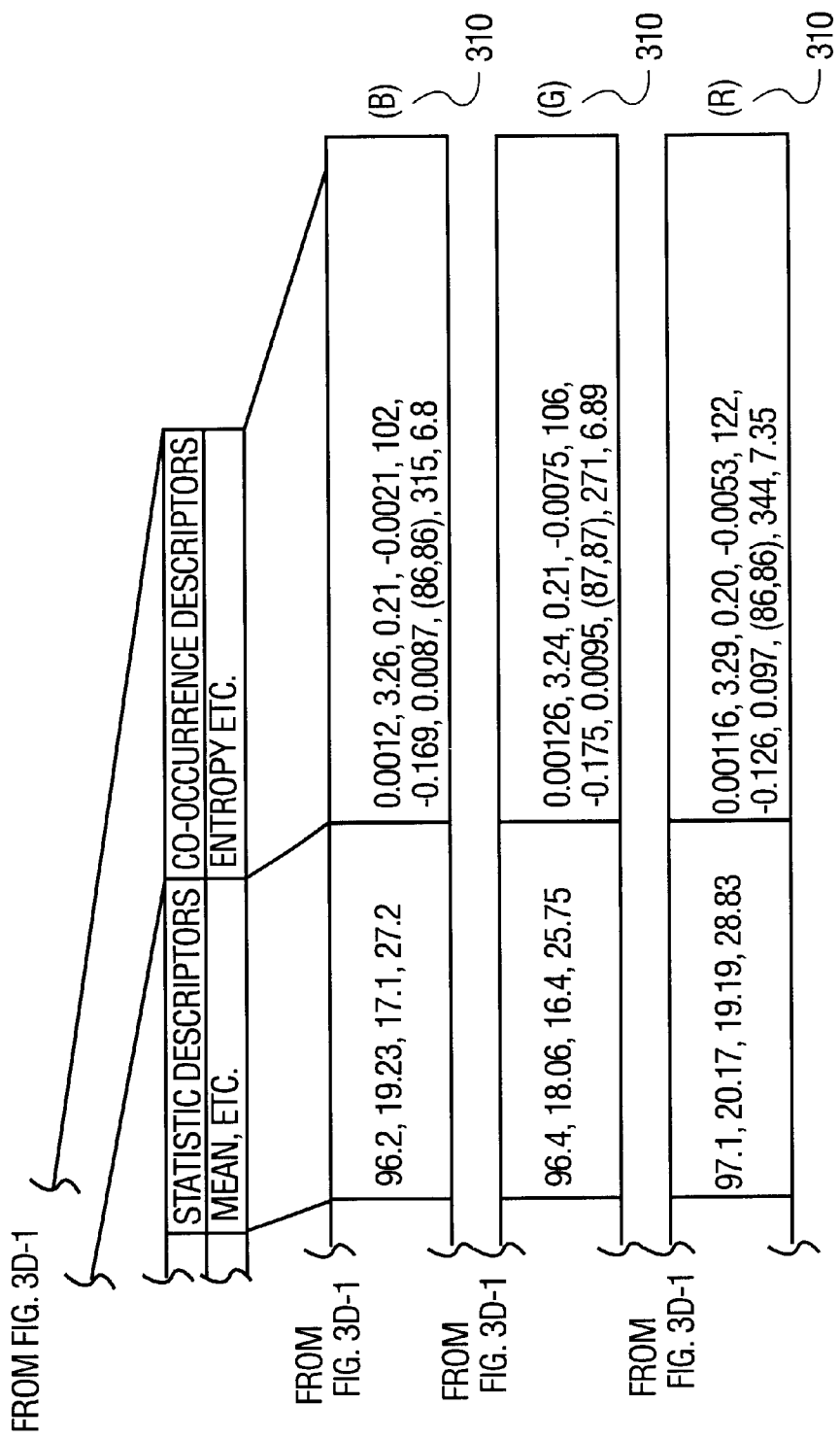

As illustrated In FIG. 3B, the individual image descriptor associated with each information band of the multi-band image of FIG. 3A, comprises peak descriptors (PD-3A), statistic descriptors (SD1-3A), co-occurence descriptors (COD1-3A), statistic descriptors (SD2-3A), and co-occurence descriptors (COD2-3A), with an identifier of R, G, or B, identifying the corresponding individual image descriptor associated with each information band of the multi-band image. Similarly, as illustrated in FIGS. 3D-1 & 3D-2, the individual image descriptor associated with each information band of the multi-band image of FIG. 3C, comprises peak descriptors (PD-3C), statistic descriptors (SD1-3C), co-occurence descriptors (COD1-3C), statistic descriptors (SD2-3C), and co-occurence descriptors (COD2-3C), with an identifier of R, G, or B, identifying the corresponding individual image descriptor associated with each information band of the multi-band image.

Accordingly, the difference between the corresponding statistic descriptors (SD) associated with each image descriptor for each corresponding information band of the multi-band image is determined, wherein the difference is determined by the following calculation for each information band (R, G, and B) of the multi-band image: [(SD1-3A)-(SD1-3C)]+[(SD2-3A)-(SD2-3C)]. Likewise, the difference between the peak descriptors (PD) associated with each image descriptor for each corresponding information band of the multi-band image is determined, wherein the difference is determined by the following calculation for each information band (R, G, and B) of the multi-band image: [(PD-3A)-(PD-3C)]. Similarly, the difference between the co-occurence matrix descriptors (COD) associated with each image descriptor for each corresponding information band of the multi-band image is determined, wherein the difference is determined by the following calculation for each information band (R, G, and B) of the multi-band image: [(COD1-3A)-(COD1-3C)]+[(COD2-3A)-(COD2-3C)].

Accordingly, for each respective information band, the difference between the statistic descriptors (SD), peak descriptors (PD), and the co-occurence matrix descriptors (COD) of each image descriptor is compared to a definable correlation value (CV). The definable correlation value (CV) assists in indicating whether there is a correlation between the image descriptors, and therefore a correlation between the images themselves. Accordingly, based upon the magnitude of the difference between the respective elements (SD, PD, and COD) of the respective image descriptors as compared against the definable correlation value (CV), a correlation is either accomplished or not accomplished. Provided the difference between the respective elements (SD, PD, and COD) of the respective image descriptors is less than the definable correlation value (CV) a correlation is achieved. Otherwise, provided the difference between the respective elements (SD, PD, and COD) of the respective image descriptors is greater than the definable correlation value (CV) a correlation is not achieved (non-correlation).

Image descriptors which are classified into the non-orientation category, as illustrated by Block 205C, are analyzed in accordance with the non-orientation category correlation protocol 215C. The non-orientation category correlation protocol 215C assists in determining a correlation between the image descriptors represented within the non-orientation category. Select elements associated with a first image descriptor (ID1) and second image descriptor (ID2) are examined to determine the status of the orientation information, if any, contained in each image descriptor for each information band. Accordingly, the determination of a correlation between images, described by image descriptors ID1 and ID2, within the non-orientation category is determined by examining the image descriptors associated with each image.

At least one image descriptor, from the series of image descriptors associated with the respective information bands which comprise a multi-band image, exhibits the corresponding representative non-orientation peak data identifying the respective image descriptor as corresponding to the non-orientation category, in order to identify the image descriptors (ID1 and ID2) as belonging to the non-orientation category.

Accordingly at Block 245, each image descriptor associated with the respective information bands comprising the respective multi-band images is examined in order to determine which image descriptors exhibit the corresponding data identifying the non-orientation peak (non-orientation peak data) within an individual image descriptor of an associated information band.

Provided all the image descriptors for each of the information bands comprising the multi-band image exhibit the corresponding non-orientation data, the respective image descriptors for each of the information bands comprising the multi-band image are re-configured for re-processing. Specifically, at Block 250, the respective image descriptors for each of the information bands comprising the respective multi-band images are re-configured by removing the non-orientation data from each of the respective image descriptors. Alternately, in another embodiment, the non-orientation data is simply disregarded or ignored for the purposes of re-processing the respective image descriptors.

Accordingly, after re-configuring the respective image descriptors for each information band of the respective multi-band images, the image descriptors associated with each image are returned to Block 200 for re-categorization. Accordingly, the respective image descriptors for each information band of the multi-band image are re-examined in order to determine the image category associated with each image descriptor.

Similarly, at Block 200, select elements within the peak descriptors (PD) of each image descriptor are examined to determine the image category associated with the image descriptor. As mentioned in relation to FIG. 1, the peak descriptors (PD) are comprised of position, value, and shape data used to classify images into different image categories based upon the data contained in the peak descriptors. As such, the peak descriptors (PD) contained in the respective image descriptors are used to re-categorize or re-classify each image descriptor, and thereby each image, as corresponding to a particular image category.

Since the non orientation data has been removed or otherwise disregarded, the respective image descriptors for each information band of the multi-band image are re-categorized into either a smooth category or big peak category in accordance with the characteristics exhibited by the respective orientation histograms. Accordingly, the respective image descriptors are re-processed as image descriptors of the smooth category or big peak category type in accordance with the respective correlation protocol.

Alternately, in the event that any one of the image descriptors associated with the corresponding information bands of a multi-band image fails to exhibit non-orientation data, as illustrated by Block 255, the particular image descriptor corresponding to the information band without the non-orientation data is simply disregarded or removed. Accordingly, after removing the respective image descriptors for each information band of the multi-band image failing to exhibit non-orientation data, the remaining image descriptors for each image are returned to Block 200 for re-processing. At Block 200, the remaining image descriptors are re-examined in order to determine the image category associated with each remaining image descriptor.

At Block 200, select elements within the peak descriptors (PD) of each of the remaining image descriptor are re-examined to determine the image category associated with the image descriptor. As mentioned in relation to FIG. 1, the peak descriptors (PD) are comprised of position, value, and shape data used to classify images into different image categories based upon the data contained in the peak descriptors. As such, the peak descriptors (PD) contained in the respective remaining image descriptors are used to re-categorize or re-classify each image descriptor, and thereby each image, as corresponding to a particular image category.

Since those image descriptors associated with the corresponding information bands of a multi-band image failing to exhibit non-orientation data have been removed or otherwise disregarded, the respective remaining image descriptors for each information band of the multi-band image are re-categorized into either a smooth category or big peak category in accordance with the characteristics exhibited by the respective orientation histograms. Accordingly, the remaining respective image descriptors are re-processed as image descriptors of the smooth category or big peak category type in accordance with the respective correlation protocol.

As the processing of image descriptors is performed, a series of difference values are generated by the comparison of the select elements associated with respective image descriptors. The series of difference values between the image descriptors may be used to rank the magnitude of correlation between the images for those image descriptors which have satisfied the correlation value (CV). For instance, if the difference value between the select elements of the image descriptors is of a small magnitude, the difference between the image features is of a small magnitude. As such, if the difference value between the select elements of the image descriptors is of a small magnitude, the correlation between the images would be higher indicating that the image features are closely related to each other.

Alternately, if the difference value between the select elements of the image descriptors is of a larger magnitude, the difference between the image features is of a larger magnitude. As such, if the difference value between the select elements of the image descriptors is of a larger magnitude, the correlation between the images would be lower indicating that the image features are less closely related to each other.

Accordingly, the images may be ranked according to the magnitude of the difference value between the select elements of the image descriptors in order to organize or assist in determining the closest match or correlation between images. Those image descriptors having a smaller magnitude between the select elements of the image descriptors would correspondingly rank higher than those image descriptors having a larger magnitude between the select elements of the image descriptors.

Figure 6:
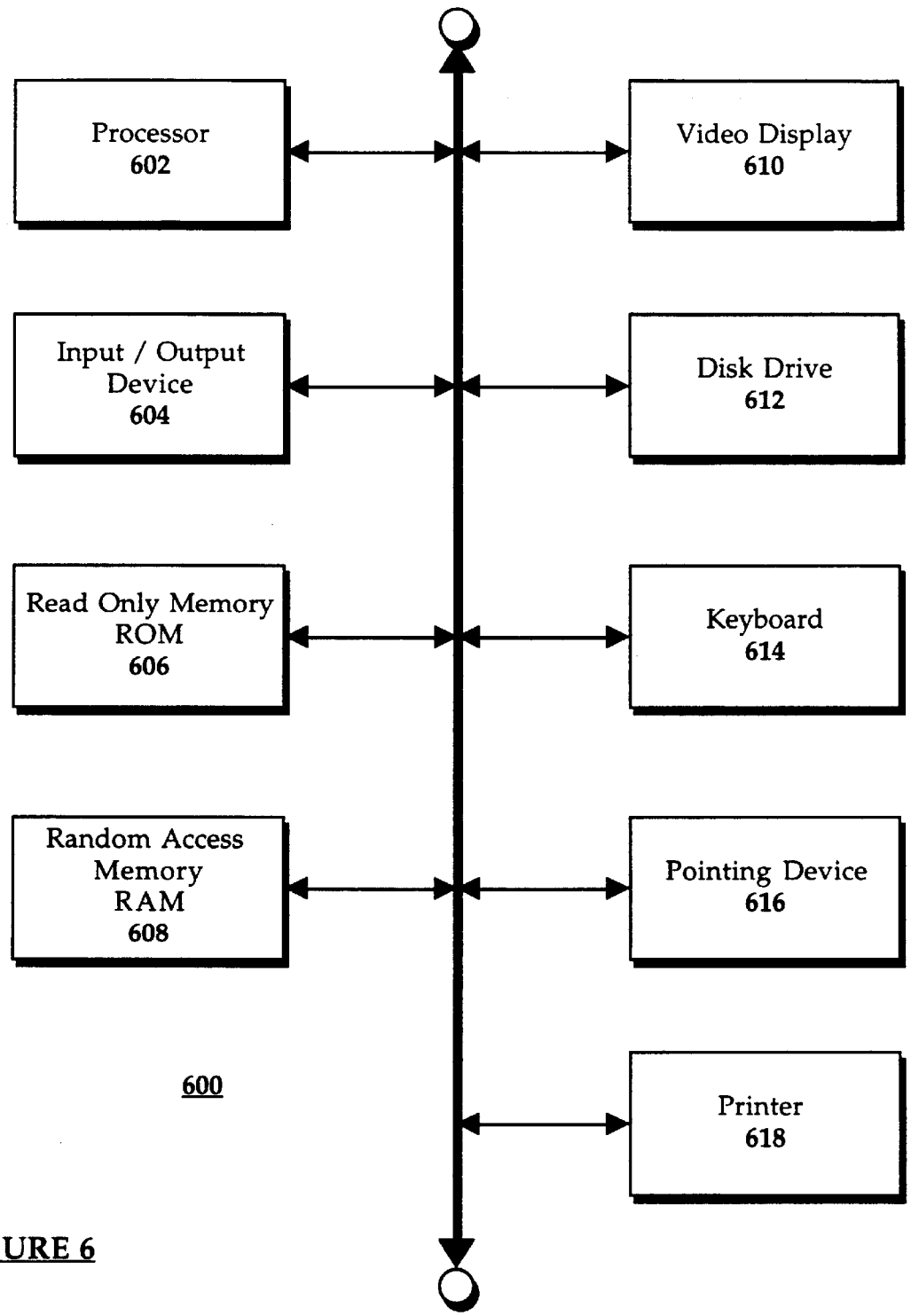
FIG. 6 illustrates an embodiment of a computer system which is capable of implementing the teachings of the present invention.

FIG. 6 illustrates an embodiment of a computer system that can be used with the present invention (e.g., as an image recognition system). The various components shown in FIG. 6 are provided by way of example. Certain components of the computer in FIG. 6 can be deleted from the image recognition system for a particular implementation of the invention. The computer shown in FIG. 6 may be any type of computer including a general purpose computer.

FIG. 6 illustrates a system bus 600 to which various components are coupled. A processor 602 performs the processing tasks required by the computer. Processor 602 may be any type of processing device capable of implementing the steps necessary to perform the addressing and delivery operations discussed above. An input/output (I/O) device 604 is coupled to bus 600 and provides a mechanism for communicating with other devices coupled to the computer. A read-only memory (ROM) 606 and a random access memory (RAM) 608 are coupled to bus 600 and provide a storage mechanism for various data and information used by the computer. Although ROM 606 and RAM 608 are shown coupled to bus 600, in alternate embodiments, ROM 606 and RAM 608 are coupled directly to processor 602 or coupled to a dedicated memory bus (not shown).

A video display 610 is coupled to bus 600 and displays various information and data to the user of the computer. A disk drive 612 is coupled to bus 600 and provides for the long-term mass storage of information. Disk drive 612 may be used to store various profile data sets and other data generated by and used by the addressing and delivery system. A keyboard 614 and pointing device 616 are also coupled to bus 600 and provide mechanisms for entering information and commands to the computer. A printer 618 is coupled to bus 600 and is capable of creating a hard-copy of information generated by or used by the computer.

Figure 7:
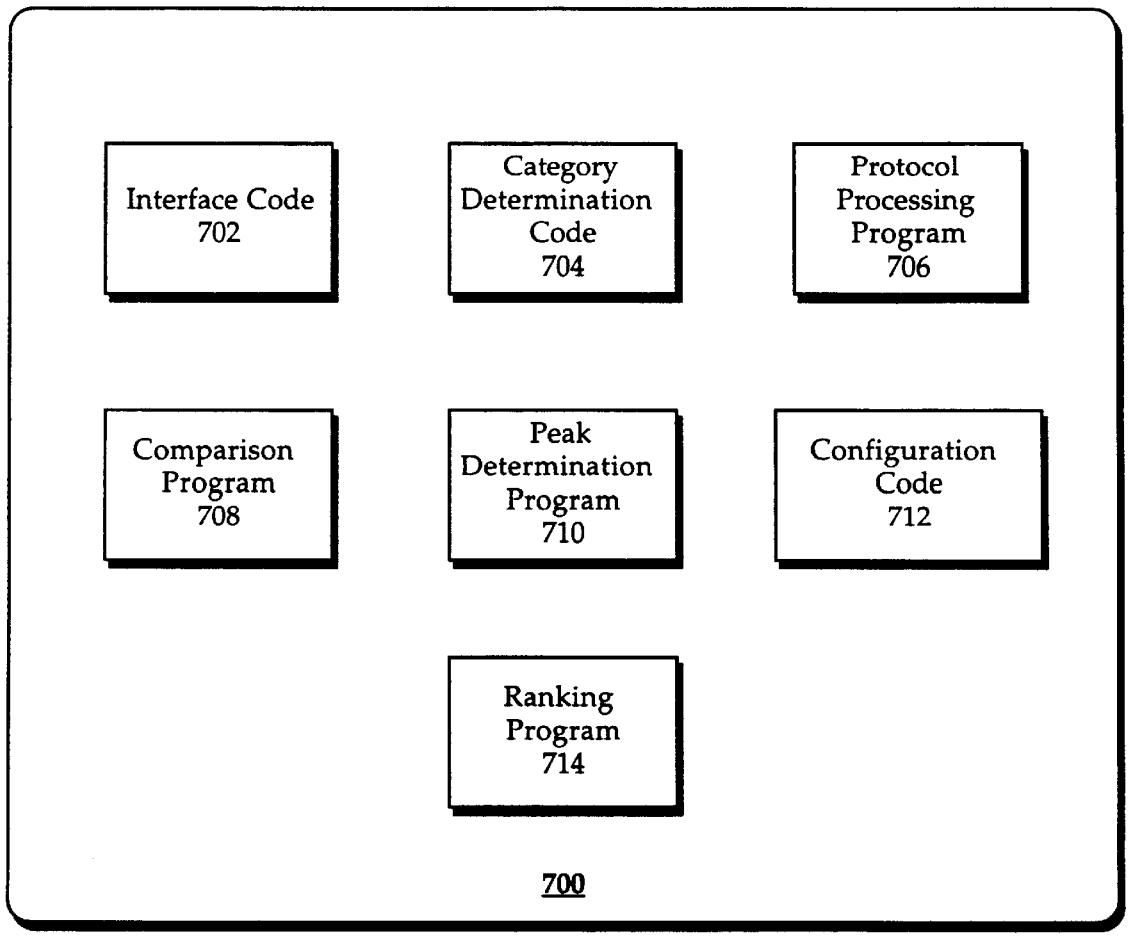
FIG. 7 illustrates an embodiment of a computer-readable medium which is capable of implementing the teachings of the present invention.

FIG. 7 illustrates an embodiment of a computer-readable medium 700 containing various sets of instructions, code sequences, configuration information, and other data used by a computer, processor, or other processing device. The embodiment illustrated in FIG. 7 is suitable for use with the computer system/image recognition system described above. The various information stored on medium 700 is used to perform various data processing operations. Computer-readable medium 700 is also referred to as a processor-readable medium. Computer-readable medium 700 can be any type of magnetic, optical, or electrical storage medium including a diskette, magnetic tape, CD-ROM, memory device, or other storage medium.

Computer-readable medium 700 includes interface code 702 that controls the flow of information between various devices or components in the image recognition system. Interface code 702 may control the transfer of information within a device (e.g., between the processor and a memory device), or between an input/output port and a storage device, or control the transfer of information from one device to another.

Computer-readable medium 700 also includes category determination code 704 used to assist in the determination of a correlation between images, wherein each image is represented by an image descriptor. It is understood that for multi-band images, the image descriptor associated with the multi-band image is comprised of a series of an individual image descriptors for each information band (e.g., color band) comprising the multi-band image. Further, the series of an individual image descriptors for each information band of a multi-band image may be represented as a single image descriptor containing the corresponding image description information for each information band of a multi-band image.

Initially, the category determination code 704 receives at least two image descriptors, a first image descriptor (ID1) and a second image descriptor (ID2) which correspond, respectively, to a first image and a second image. It is understood that multiple image descriptors could be received by the image recognition system for simultaneous image processing, or alternatively, a single image descriptor could be received by the image recognition system for comparison against a database of images or image descriptors.

Accordingly, the category determination code 704 examines each image descriptor associated with an image in order to determine the corresponding image category associated with each image descriptor. Specifically, the descriptor elements within the peak descriptors (PD) of each image descriptor are examined to determine the image category associated with the image descriptor. The peak descriptors (PD) contained in the respective image descriptors are used to categorize or classify each image descriptor, and thereby each image, as corresponding to a particular image category. In the present embodiment, the category determination code 704 is configured to classify the image descriptors as belonging to the following category types: a 'big peak category', a 'smooth category', or a 'non-orientation category'.

Accordingly, the category determination code 704 examines the respective image descriptors (ID1 and ID2) associated with each image to determine whether the respective images, represented by image descriptors ID1 and ID2, belong to the same general category. As mentioned above, each image descriptor is associated with, or corresponds to, a particular category. For example, image descriptor s corresponding to orientation histograms having a relatively smooth pattern are classified into a smooth category, image descriptors which are characterized by orientation histograms having large peaks are classified into a large peak category, and images descriptors which correspond to orientation histograms which exhibit a large peak in the position of the orientation histogram which is indexed as "non-orientation area" are classified into a non-orientation category.

Provided the respective image descriptors, ID1 and ID2, being examined belong to the same category type, the respective image descriptors are then forwarded to a protocol processing program 706 in order to be processed in accordance category correlation protocol associated with category types of the respective image descriptors.

In the event that the image descriptors being compared to each other do not belong within the same category type, a difference number is assigned by the category determination code 704 which indicates that the representative image descriptors being compared belong to different respective categories. As such, the assigned difference number indicates that the proffered image descriptor (ID2) and the reference image descriptor (ID1) are associated with different category types. Accordingly, the magnitude of the difference number reflects the magnitude of a correlation difference between the proffered image descriptor (ID2) and the reference image descriptor (ID1). Therefore, a large correlation difference number between the respective image descriptors would indicate a large image difference between the respective image descriptors, and a small correlation difference number between image descriptors would indicate a small image difference between the image descriptors.

Provided the image descriptors belong to the same category type, the image descriptors are processed by the protocol processing program 706 in accordance with the correlation protocol corresponding to the particular category type associated with the image descriptors. As such, three different correlation protocols are provided by the protocol processing program 706, a smooth category correlation protocol, a large peak category correlation protocol, and a non-orientation category correlation protocol, which correspond to the three different image category groups of the present embodiment.

Image descriptors which are classified into the smooth category are analyzed in accordance with the smooth category correlation protocol maintained in the protocol processing program 706. The smooth category correlation protocol assists in determining a correlation between the image descriptors represented within the smooth category. Select elements associated with a first image descriptor (ID1) are compared against select corresponding elements of a second image descriptor (ID2) in order to determine if there is a correlation between the image descriptors (ID1 and ID2) represented in the smooth category.

The difference between select corresponding elements of each respective image descriptor in the smooth category is determined to assist in the determination of a correlation between the image descriptors, and thereby the images themselves. Initially, the difference between the respective corresponding statistic descriptors (SD) associated with the first image descriptor (ID1) and second image descriptor (ID2) is determined. Next, the difference between the respective corresponding co-occurence matrix descriptors (COD) associated with the first image descriptor (ID1) and second image descriptor (ID2) is determined.

Accordingly, a comparison program 708 compares the difference between the statistic descriptors (SD) of the image descriptors (ID1 and ID2) and the difference between the co-occurence matrix descriptors (COD) against a definable correlation value (CV) which indicates whether the difference between the respective select elements of the image descriptors is of a magnitude which indicates a correlation between the image descriptors, and thereby a correlation between the images themselves. The definable correlation value (CV) may be defined in accordance with the preferences of a particular user or imaging system in order to customize the sensitivity of the image comparison/correlation process.

The definable correlation value (CV) is used to assist in indicating whether there is a correlation between the image descriptors, and therefore a correlation between the images themselves. Accordingly, based upon the magnitude of the difference between the respective elements (SD and COD) of the respective image descriptors as compared against the definable correlation value (CV), a correlation is either accomplished or not accomplished. Provided the difference between the respective elements (SD and COD) of the respective image descriptors is less than the definable correlation value (CV), a correlation is achieved. Otherwise, provided the difference between the respective elements (SD and COD) of the respective image descriptors is greater than the definable correlation value (CV), a correlation is not achieved (non-correlation).

Image descriptors which are classified into the large peak category are analyzed in accordance with the large peak category correlation protocol maintained in the protocol processing program 706. The large peak category correlation protocol assists in determining a correlation between the image descriptors represented within the large peak category. Select elements associated with a first image descriptor (ID1) are compared against select corresponding elements of a second image descriptor (ID2) in order to determine if there is a correlation between the image descriptors (ID1 and ID2) represented in the large peak category. Accordingly, the determination of a correlation between images, described by image descriptors ID1 and ID2, within the large peak category is determined by examining the image descriptors associated with each image.

Initially, a peak determination program 710 examines each image descriptor in order to determine the best match between corresponding peak information contained in the peak descriptor (PD) information of each image descriptor (ID1 and ID2) being compared. Specifically, the peak descriptor (PD) information contained in each image descriptor for each information band comprising the multi-band image is examined in order to determine the best match between corresponding peak information contained in the respective peak descriptor (PD) information of each image descriptor. As such, the peak determination program 710 compares the peak descriptor (PD) information for each information band of the first image descriptor ID1 against the corresponding peak descriptor (PD) information for each corresponding information band of the second image descriptor ID2 in order to determine the best match between the peak information contained in the respective peak descriptors (PD). Some peak information, such as minor peaks due to noise or interference, may be filtered out or ignored when determining the best match between peak information.

A variety of different techniques may be used by the peak determination program 710 to determine the best match between peak information, such as, but not limited to, a signal matching algorithm, signal pattern matching computer program, or other mathematical determination technique. Once the best match between peak information of the respective peak descriptors (PD) is determined, select components of the corresponding image descriptors (ID1 and ID2), which have satisfied the best match between peak information, are analyzed in order to determine if there is a correlation between the respective images described by the corresponding image descriptors (ID1 and ID2).

Accordingly, the protocol processing program 706 compares select corresponding elements of each image descriptor (ID1 and ID2) within the big peak category against each other in order to determine whether there is a correlation between the respective image descriptors in the big peak category. Specifically, select elements of the first image descriptor (ID1) for each information band of the first multi-band image are compared against select corresponding select elements of the second image descriptor (ID2) for each corresponding information band of the second multi-band image, in order to determine if there is a correlation between the respective image descriptors (ID1 and ID2) represented in the large peak category. The difference between the select elements of the respective image descriptors for each information band of the respective multi-band images are used by the comparison program 708 to determine if there is a correlation between the image descriptors (ID1 and ID2) represented in the large peak category.

Initially, the protocol processing program 706 determines the difference between the respective corresponding statistic descriptors (SD) for each corresponding information band associated with the first image descriptor (ID1) and the second image descriptor (ID2). Next, the protocol processing program 706 determines the difference between the respective corresponding peak descriptors (PD) for each corresponding information band associated with the first image descriptor (ID1) and second image descriptor (ID2). Finally, the protocol processing program 706 determines the difference between the respective corresponding co-occurence matrix descriptors (COD) for each corresponding information band associated with the first image descriptor (ID1) and second image descriptor (ID2).

Accordingly, the comparison program 708 compares the difference between the statistic descriptors of the image descriptors (ID1 and ID2), the difference between the peak descriptors of the image descriptors (ID1 and ID2), and the difference between the co-occurence matrix descriptors of the image descriptors (ID1 and ID2) to a definable correlation value (CV) which indicates whether the difference between the respective select elements of the image descriptors is of a magnitude which indicates a correlation between the image descriptors, and thereby a correlation between the images themselves. The definable correlation value (CV) can be defined in accordance with the preferences of a particular user or imaging system in order to customize the sensitivity of the image comparison/correlation process.

Image descriptors which are classified into the non-orientation category are analyzed in accordance with the non-orientation category correlation protocol maintained in the protocol processing program 706. The non-orientation category correlation protocol assists in determining a correlation between the image descriptors represented within the non-orientation category. Select elements associated with a first image descriptor (ID1) and second image descriptor (ID2) are examined to determine the status of the orientation information, if any, contained in each image descriptor for each information band. Accordingly, the determination of a correlation between images, described by image descriptors ID1 and ID2, within the non-orientation category is determined by examining the image descriptors associated with each image.

At least one image descriptor, from the series of image descriptors associated with the respective information bands which comprise the respective multi-band images, exhibits the corresponding representative non-orientation peak data identifying the respective image descriptor as corresponding to the non-orientation category, in order to identify the image descriptors (ID1 and ID2) as belonging to the non-orientation category.

Accordingly, the protocol processing program 706 examines each image descriptor associated with the respective information bands comprising the respective multi-band images in order to determine which image descriptors exhibit the corresponding data identifying the non-orientation peak (non-orientation peak data) within an individual image descriptor of an associated information band.

Provided all the image descriptors for each of the information bands comprising the multi-band image exhibit the corresponding non-orientation data, the respective image descriptors for each of the information bands comprising the multi-band image are re-configured by configuration code 712 for re-processing. Specifically, the configuration code 712 re-configures the respective image descriptors for each of the information bands comprising the multi-band image by removing the non-orientation data from each of the respective image descriptors. Alternately, in another embodiment, the non-orientation data is simply disregarded or ignored for the purposes of re-processing the respective image descriptors.

Accordingly, after the configuration code 712 re-configures the respective image descriptors for each information band of the multi-band image, the image descriptors associated with each image are returned to category determination code 704. Accordingly, the category determination code 704 re-examines the respective image descriptors for each information band of the multi-band image are in order to determine the image category associated with each image descriptor.

Since the non-orientation data has been removed or otherwise disregarded, the respective image descriptors for each information band of the multi-band image are re-categorized by the category determination code 704 into either a smooth category or big peak category in accordance with the characteristics exhibited by the respective orientation histograms. Accordingly, the respective image descriptors are re-processed as image descriptors of the smooth category or big peak category type in accordance with the respective correlation protocol.

Alternately, in the event that any one of the image descriptors associated with the corresponding information bands of a multi-band image fails to exhibit non-orientation data, the particular image descriptor corresponding to the information band without the non-orientation data is simply disregarded or removed by the configuration code 712. Accordingly, after the configuration code 712 removes the respective image descriptors for each information band of the multi-band image failing to exhibit non-orientation data, the remaining image descriptors for each image are returned to the category determination code 704 for re-processing. The category determination code 704 re-examines the remaining image descriptors in order to determine the image category associated with each remaining image descriptor.

Since those image descriptors associated with the corresponding information bands of a multi-band image failing to exhibit non-orientation data have been removed or otherwise disregarded by the configuration code 714, the respective remaining image descriptors for each information band of the multi-band image are re-categorized by the category determination code 704 into either a smooth category or big peak category in accordance with the characteristics exhibited by the respective orientation histograms. Accordingly, the remaining respective image descriptors are re-processed as image descriptors of the smooth category or big peak category type in accordance with the respective correlation protocol.

As the processing of image descriptors is performed, a series of difference values are generated by the comparison of the select elements associated with respective image descriptors. The series of difference values between the image descriptors may be used by a ranking program 714 to rank the magnitude of correlation between the images for those image descriptors which have satisfied the correlation value (CV). For instance, if the difference value between the select elements of the image descriptors is of a small magnitude, the difference between the image features is of a small magnitude. As such, if the difference value between the select elements of the image descriptors is of a small magnitude, the correlation between the images would be higher indicating that the image features are closely related to each other.

Alternately, if the difference value between the select elements of the image descriptors is of a larger magnitude, the difference between the image features is of a larger magnitude. As such, if the difference value between the select elements of the image descriptors is of a larger magnitude, the correlation between the images would be lower indicating that the image features are less closely related to each other.

Accordingly, the images may be ranked by the ranking program 714 according to the magnitude of the difference value between the select elements of the image descriptors in order to organize or assist in determining the closest match or correlation between images. Those image descriptors having a smaller magnitude between the select elements of the image descriptors would correspondingly be ranked higher by the ranking program 714 than those image descriptors having a larger magnitude between the select elements of the image descriptors.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of determining a correlation between images, wherein each image is represented by an image descriptor, each image descriptor comprising a peak descriptor, a set of statistic descriptors, and a set of co-occurence descriptors, the method comprising:

determining a category associated with each image descriptor; and determining a difference value between select corresponding elements of respective image descriptors in accordance with an associated correlation protocol provided the image descriptors belong to a common category, the difference value representing the correlation between the images represented by respective image descriptors.

2. The method of claim 1, wherein the images comprise multi-band images, each multi-band image having an associated image descriptor for each information band of the multi-band image.

3. The method of claim 1, wherein the set of statistic descriptors comprise an orientation statistic descriptor and an energy statistic descriptor.

4. The method of claim 1, wherein the set of co-occurence matrix descriptors comprise an orientation co-occurence descriptor and an energy co-occurence descriptor.

5. The method of claim 1, wherein the peak descriptor contains data indicating a category type associated with a corresponding image descriptor.

6. The method of claim 5, wherein the image descriptors correspond to a large peak category type.

7. The method of claim 6, further including the step of determining a correlation between corresponding peak information contained in the respective image descriptors.

8. The method of claim 7, wherein the step of determining a difference value between the image descriptors comprises:

determining a difference between a corresponding set of statistic descriptors associated with the respective image descriptors;

determining a difference between a corresponding peak descriptors associated with the respective image descriptors; and determining a difference between a corresponding set of co-occurence matrix descriptors associated with the respective image descriptors.

9. The method of claim 8, further including the step of comparing the difference value to a correlation value to determine a magnitude of correlation between the image descriptors.

10. The method of claim 5, wherein the image descriptors correspond to a smooth category type.

11. The method of claim 10, wherein the step of determining a difference value between the image descriptors comprises:

determining a difference between a corresponding set of statistic descriptors associated with the respective image descriptors; and determining a difference between a corresponding set of co-occurence matrix descriptors associated with the respective image descriptors.

12. The method of claim 11, further including the step of comparing the difference value to a correlation value to determine a magnitude of correlation between the image descriptors.

13. The method of claim 5, wherein the image descriptors correspond to a non-orientation category type.

14. The method of claim 13, wherein the step of determining a difference value between the image descriptors comprises:

classifying the orientation of each image descriptor for each information band of a respective image;

removing non-orientation peak information from each image descriptor associated with the respective images provided each image descriptor for each information band corresponds to a non-orientation classification; and re-processing the image descriptors associated with each respective image.

15. The method of claim 13, where the step of determining a difference value between the image descriptors comprises:

classifying the orientation of each image descriptor for each information band of a respective image;

removing image descriptors associated with information bands of a multi-band image provided that the image descriptors being removed image fail to correspond to a non-orientation classification; and re-processing each remaining image descriptor.

16. A computer software product including a medium readable by a processor, the medium having stored thereon a sequence of executable instructions which, when executed by a processor, cause the processor to:

determine a category associated with image descriptors, each image descriptor comprising a peak descriptor, a set of statistic descriptors, and a set of co-occurence descriptors; and determine a difference value between select corresponding components of respective image descriptors in accordance with an associated correlation protocol provided the image descriptors belong to a common category, the difference value representing a correlation between images represented by respective image descriptors.

17. The computer software product of claim 16, wherein the images comprise multi-band images, each multi-band image having an associated image descriptor for each information band of the multi-band image.

18. The computer software product of claim 16, wherein the set of statistic descriptors comprise an orientation statistic descriptor and an energy statistic descriptor.

19. The computer software product of claim 16, wherein the set of co-occurence matrix descriptors comprise an orientation co-occurence descriptor and an energy co-occurence descriptor.

20. The computer software product of claim 16, wherein the peak descriptor contains data indicating a category type associated with a corresponding image descriptor.

21. The computer software product of claim 20, wherein the image descriptors correspond to a large peak category type.

22. The computer software product of claim 21, further including the step of determining a correlation between corresponding peak information contained in the respective image descriptors.

23. The computer software product of claim 22, wherein the step of determining a difference value between the image descriptors comprises:

determining a difference between a corresponding set of statistic descriptors associated with the respective image descriptors;

determining a difference between a corresponding peak descriptors associated-with the respective image descriptors; and determining a difference between a corresponding set of co-occurence matrix descriptors associated with the respective image descriptors.

24. The computer software product of claim 23, further including the step of comparing the difference value to a correlation value to determine a magnitude of correlation between the image descriptors.

25. The computer software product of claim 20, wherein the image descriptors correspond to a smooth category type.

26. The computer software product of claim 25, wherein the step of determining a difference value between the image descriptors comprises:

determining a difference between a corresponding set of statistic descriptors associated with the respective image descriptors; and determining a difference between a corresponding set of co-occurence matrix descriptors associated with the respective image descriptors.

27. The computer software product of claim 26, further including the step of comparing the difference value to a correlation value to determine a magnitude of correlation between the image descriptors.

28. The computer software product of claim 20, wherein the image descriptors correspond to a non-orientation category type.

29. The computer software product of claim 28, wherein the step of determining a difference value between the image descriptors comprises:

classifying the orientation of each image descriptor for each information band of a respective image;

removing non-orientation peak information from each image descriptor associated with the respective images provided each image descriptor for each information band corresponds to a non-orientation classification; and re-processing the image descriptors associated with each respective image.

30. The computer software product of claim 28, where the step of determining a difference value between the image descriptors comprises:

classifying the orientation of each image descriptor for each information band of a respective image;

removing image descriptors associated with information bands of a multi-band image provided that the image descriptors being removed image fail to correspond to a non-orientation classification; and re-processing each remaining image descriptor.

* * * * *